(12) United States Patent
Tseng et al.

(10) Patent No.: US 12,271,106 B2
(45) Date of Patent: Apr. 8, 2025

(54) VARIABLE APERTURE MODULE, IMAGING LENS MODULE AND ELECTRONIC DEVICE

(71) Applicant: LARGAN PRECISION CO., LTD., Taichung (TW)

(72) Inventors: Te-Sheng Tseng, Taichung (TW); Chen Wei Fan, Taichung (TW); Ming-Ta Chou, Taichung (TW); Kuan-Ming Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 8 days.

(21) Appl. No.: 18/134,492

(22) Filed: Apr. 13, 2023

(65) Prior Publication Data

US 2024/0069410 A1   Feb. 29, 2024

Related U.S. Application Data

(60) Provisional application No. 63/401,518, filed on Aug. 26, 2022.

(51) Int. Cl.
  *G03B 9/22*    (2021.01)
  *G03B 9/24*    (2021.01)
(52) U.S. Cl.
  CPC ............. *G03B 9/22* (2013.01); *G03B 9/24* (2013.01)
(58) Field of Classification Search
  CPC ........... G03B 9/24; G03B 9/22; G03B 9/02; G03B 2205/0069; G03B 9/06
  See application file for complete search history.

(56) References Cited

U.S. PATENT DOCUMENTS

| 3,675,562 A | 7/1972 | Sanada et al. |
| 5,422,697 A * | 6/1995 | Ichinomiya ........ G02B 27/0018 396/510 |
| 7,287,864 B2 | 10/2007 | Shirasu et al. |

(Continued)

FOREIGN PATENT DOCUMENTS

| CN | 103376614 B | 6/2017 |
| CN | 110687736 A | 1/2020 |

(Continued)

OTHER PUBLICATIONS

Extended European Search Report dated Feb. 1, 2024 as received in Application No. 23165073.0.

*Primary Examiner* — Christopher E Mahoney
(74) *Attorney, Agent, or Firm* — Maschoff Brennan

(57) ABSTRACT

A variable aperture module includes a blade assembly including movable blades, a positioning element including positioning structures and a driving part including a rotation element. The movable blades are disposed around an optical axis to form a light passable hole with adjustable size for different hole size states and each have an inner surface to define the contour of the light passable hole in each hole size state. The positioning structures correspond to the movable blades. The rotation element is rotatable with respect to the positioning element and is configured to rotate the movable blades to adjust a size of the light passable hole. There are matte structures disposed on each inner surface. Each matte structure is single structure extending towards the optical axis, such that at least part of the contour of the light passable hole has an undulating shape at least in several hole size states.

32 Claims, 29 Drawing Sheets

(56) References Cited

U.S. PATENT DOCUMENTS

| | | | |
|---|---|---|---|
| 8,764,321 B2 | 7/2014 | Ichikawa | |
| 10,690,998 B2 | 6/2020 | Hong et al. | |
| 10,824,051 B2 | 11/2020 | Seo et al. | |
| 10,969,653 B2 | 4/2021 | Kim et al. | |
| 11,733,588 B1 * | 8/2023 | Chen | G03B 9/02 396/452 |
| 2011/0058242 A1 | 3/2011 | Saito | |
| 2015/0160533 A1 | 6/2015 | Yoshizawa | |
| 2020/0241387 A1 | 7/2020 | Seo et al. | |

FOREIGN PATENT DOCUMENTS

| | | | | |
|---|---|---|---|---|
| CN | 110858048 A | | 3/2020 | |
| CN | 111487835 A | | 8/2020 | |
| CN | 212255876 U | * | 12/2020 | G02B 26/02 |
| CN | 113885269 A | | 1/2022 | |
| CN | 215867468 U | | 2/2022 | |
| CN | 114285242 A | | 4/2022 | |
| JP | H10-90752 | * | 4/1998 | G03B 9/24 |
| JP | 2008-197177 A | | 8/2008 | |
| TW | 200632418 A | | 9/2006 | |
| TW | 202409694 A | * | 3/2024 | G02B 5/005 |

\* cited by examiner

VARIABLE APERTURE MODULE, IMAGING LENS MODULE AND ELECTRONIC DEVICE

RELATED APPLICATIONS

This application claims priority to U.S. Provisional Application 63/401,518, filed on Aug. 26, 2022, which is incorporated by reference herein in its entirety.

BACKGROUND

Technical Field

The present disclosure relates to a variable aperture module, an imaging lens module and an electronic device, more particularly to a variable aperture module and an imaging lens module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

Recently, camera modules are applied to electronic devices in more fields than ever, such as portable devices (e.g., smartphones, action cameras), augmented reality (AR) or virtual reality (VR) head-mounted devices and aerial cameras. Moreover, the hardware used in the camera modules are continuously upgraded, for example, larger image sensors and imaging lenses with better image quality. A larger image sensor provides better image quality, but the background in the picture may become blurry due to an overly shallow depth of field. Conventionally, a variable aperture stop can be used to change the depth of field for adjusting the blur degree of the background and controlling the amount of incident light, such that arranging a variable aperture stop in an optical system of an electronic device becomes a forward-looking subject. However, the conventional variable aperture stop may easily cause the optical system to generate unexpected imaging effect due to diffraction. Therefore, how to improve the structure of a variable aperture module for meeting the requirement of high-end-specification electronic devices is an important topic in this field nowadays.

SUMMARY

According to one aspect of the present disclosure, a variable aperture module includes a blade assembly, a positioning element, and a driving part. The blade assembly includes a plurality of movable blades disposed around an optical axis to form a light passable hole with adjustable size for different hole size states. Each of the plurality of movable blades has an inner surface. The inner surfaces of the plurality of movable blades are configured to define a contour of the light passable hole in each hole size state. The positioning element includes a plurality of positioning structures respectively corresponding to the plurality of movable blades. The driving part includes a rotation element rotatable with respect to the positioning element. The rotation element is configured to rotate the plurality of movable blades respectively with respect to the plurality of positioning structures to adjust a size of the light passable hole. There are a plurality of matte structures disposed on each of the inner surfaces. Each of the plurality of matte structures is single structure extending towards the optical axis, such that at least part of the contour of the light passable hole has an undulating shape at least in several hole size states.

According to another aspect of the present disclosure, a variable aperture module includes a blade assembly, a positioning element, and a driving part. The blade assembly includes a plurality of movable blades surrounding an optical axis and forming a light passable hole with adjustable size for different hole size states. Each of the plurality of movable blades has an inner surface. The inner surfaces of the plurality of movable blades are configured to define a contour of the light passable hole in each hole size state, such that the contour of the light passable hole represents a polygon with a plurality of lines. The positioning element includes a plurality of positioning structures respectively corresponding to the plurality of movable blades. The driving part includes a rotation element rotatable with respect to the positioning element. The rotation element is configured to rotate the plurality of movable blades respectively with respect to the plurality of positioning structures to adjust a size of the light passable hole. There are a plurality of matte structures disposed on each of the inner surfaces. Each of the plurality of matte structures is single structure extending towards the optical axis, such that at least part of the plurality of lines represented by the contour of the light passable hole is non-linear at least in several hole size states.

According to another aspect of the present disclosure, an imaging lens module includes one of the aforementioned variable aperture modules and an imaging lens. The variable aperture module and the imaging lens are disposed along the optical axis, and light enters into the imaging lens via the light passable hole of the variable aperture module.

According to another aspect of the present disclosure, an electronic device includes the aforementioned imaging lens module.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
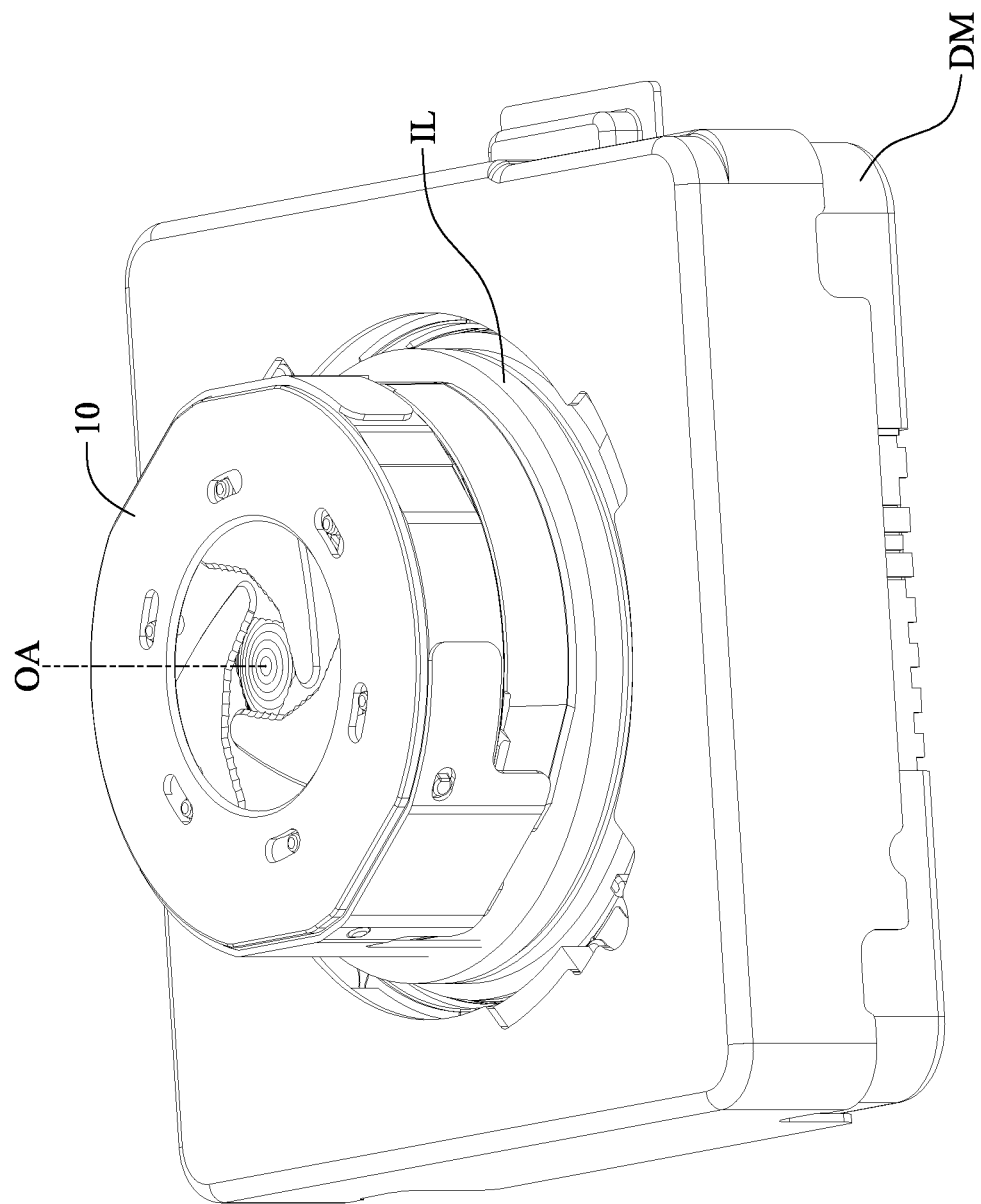
FIG. 1 is a perspective view of an imaging lens module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an imaging lens module including a variable aperture module and an imaging lens that are disposed along an optical axis.

The variable aperture module includes a blade assembly, a positioning element and a driving part.

The blade assembly includes a plurality of movable blades. The plurality of movable blades can be disposed around the optical axis to form a light passable hole with adjustable size for different hole size states. It can also be considered as that the plurality of movable blades can surround the optical axis and form a light passable hole with adjustable size for different hole size states. Moreover, light enters into the imaging lens via the light passable hole of the variable aperture module. Moreover, each of the movable blades can be a composite material structure, such as a multi-layer structure formed by a base made of polyimide (PI) or polyethylene terephthalate (PET) with two black coating layers respectively coated on two opposite surfaces thereof. Alternatively, each of the movable blades can be a uniform material structure, such as a single-layer structure made of polyoxymethylene (POM) or metal. Moreover, the abovementioned single-layer structure can also be coated by a black coating. Please refer to FIG. 23, which shows the movable blades 721 of composite material structures according to the 7th embodiment of the present disclosure, and each of them is a multi-layer structure formed by the base BS with two coatings CT respectively coated on two opposite surfaces thereof. Please refer to FIG. 11 and FIG. 28, which respectively show the movable blades 121 and 821 of a uniform material structure according to the 1st and 8th embodiments of the present disclosure.

Each movable blade has an inner surface. The plurality of inner surfaces of the movable blades are configured to define a contour of the light passable hole in each hole size state. Moreover, the contour of the light passable hole can be observed along the optical axis. Please refer to FIG. 9, which shows the inner surface 1211 of single movable blade 121 according to the 1st embodiment of the present disclosure; and please refer to FIG. 7 and FIG. 8, which show the contours of the light passable hole HL defined by the inner surfaces 1211 in the cases that the light passable hole HL are respectively in the maximum hole size state and the minimum hole size state according to the 1st embodiment of the present disclosure when observing the movable blades 121 along the optical axis OA.

The positioning element includes a plurality of positioning structures that respectively correspond to the plurality of movable blades.

The driving part includes a rotation element that is rotatable with respect to the positioning element. The rotation element is configured to rotate the movable blades respectively with respect to the positioning structures so as to adjust a size of the light passable hole.

There are a plurality of matte structures disposed on each inner surface. Each matte structure is single structure extending towards the optical axis, such that at least part of the contour of the light passable hole can have an undulating shape at least in several hole size states. It can be considered that the contour of the light passable hole can represent a polygon with a plurality of lines, and at least part of the lines represented by the contour of the light passable hole can be non-linear at least in several hole size states. Moreover, each movable blade and the matte structures disposed on the inner surface thereof can be made in one piece. Therefore, it is favorable for mass production of integrated matte structures and movable blade through a process such as stamping or inject-molding. Please refer to FIG. 9 and FIG. 10, which show the matte structures 15 disposed on the inner surface 1211 according to the 1st embodiment of the present disclosure. Please refer to FIG. 7, which shows the polygonal contour with twelve non-linear lines LN of the light passable hole HL in the maximum hole size state according to the 1st embodiment of the present disclosure. Please refer to FIG. 8, which shows the polygonal contour with six non-linear lines LN of the light passable hole HL in the minimum hole size state according to the 1st embodiment of the present disclosure.

With the arrangement of the matte structures disposed on the inner surface of the movable blade, at least part of the contour of the light passable hole can have an undulating shape or can be non-linear at least in several hole size states. Therefore, it is favorable for adjusting the diffraction pattern of imaging light, such that the variable aperture module can provide the imaging lens with proper imaging effects in the cases that the light passable hole is in different hole size states.

Each movable blade can further have a first surface and a second surface. The first surface can be perpendicular to the optical axis, the second surface can correspond to the first surface, and the inner surface can be connected to and located between the first surface and the second surface. Moreover, a distance between the inner surface and the optical axis can vary along a direction parallel to the optical axis from the first surface to the second surface. Therefore, it is favorable for reducing the part of the inner surface that is parallel to the optical axis and further reducing possibility where light is reflected off the inner surface towards the imaging lens. Moreover, there can be an air gap formed between the first surface and the second surface through an etching process performed on the inner surface. Alternatively, there can be a chamfer formed between the first surface and the second surface through a stamping process performed on the inner surface. Please refer to FIG. 23, which shows the non-planar inner surface 7211 where an air gap is formed between the first surface 7212 and the second surface 7213 according to the 7th embodiment of the present disclosure, such that the distance between the inner surface 7211 and the optical axis OA is gradually increased, gradually reduced, and then gently gradually increased from the first surface 7212 to the second surface 7213. Please refer to FIG. 11 and FIG. 28, which respectively show the single-chamfered inner surface 1211 and the double-chamfered inner surface 8211 formed between the first surfaces 1212 and 8212 and the second surfaces 1213 and 8213 according to the 1st and 8th embodiments of the present disclosure, wherein the single-chamfered inner surface 1211 makes the distance between the inner surface 1211 and the optical axis OA is gradually reduced from the first surface 1212 to the second surface 1213, and the double-chamfered inner surface 8211 makes the distance between the inner surface 8211 and the optical axis OA is gradually reduced and then gradually increased from the first surface 8212 to the second surface 8213.

Each movable blade can further include an anti-reflection layer that can be disposed on at least one of the first surface, the second surface and the inner surface. Therefore, it is favorable for reducing possibility where light is reflected off the first surface, the second surface or the inner surface towards the imaging lens. Moreover, the anti-reflection layer can be a multi-layer film structure where layers of high refractive indices and low refractive indices are stacked. Alternatively, the anti-reflection layer can be a moth-eye anti-reflection structure having a gradient refractive index. However, the present disclosure is not limited thereto. Please refer to FIG. 28, which shows the anti-reflection layers 8214 disposed on the first surface 8212 and the second surface 8213 according to the 8th embodiment of the present disclosure.

In each movable blade, a ratio of a first central angle (indicated by "a" in the following and the drawings) subtended from the optical axis by at least part of the contour of the light passable hole on which the plurality of matte structures are located to a second central angle (indicated by "8" in the following and the drawings) subtended from the optical axis by at least part of the contour of the light passable hole on which the inner surface is located can be variable according to adjustment of the size of the light passable hole. By designing the light passable hole with different adjustable sizes for representing different ratios of the first central angle (referring to the matte structures) to the second central angle (referring to the inner surface), it is favorable for obtaining good imaging quality of the imaging lens when the light passable hole is in a specific adjustable size under the principle that light diffraction is variable based on the adjustable size of the light passable hole. Preferably, the abovementioned ratio of the first central angle (referring to the matte structures) to the second central angle (referring to the inner surface) can become greater as the size of the light passable hole becomes smaller. However, the present disclosure is not limited thereto.

In the case that the light passable hole is in the minimum hole size state, when the first central angle subtended from the optical axis by at least part of the contour of the light passable hole on which the plurality of matte structures are located among each movable blade is α, and the second central angle subtended from the optical axis by at least part of the contour of the light passable hole on which the inner surface is located among each movable blade is θ, the following condition can be satisfied: 8%≤(α/θ)×100%≤100%. Therefore, the matte structures is favorable for providing good imaging effect for the imaging lens. Please refer to FIG. 7, which shows α and θ in the case that the light passable hole HL is in the maximum hole size state according to the 1st embodiment of the present disclosure, wherein α includes three values of α-1, α-2 and α-3. Please refer to FIG. 8, which shows α and θ in the case that the light passable hole HL is in the minimum hole size state according to the 1st embodiment of the present disclosure.

The driving part can further include a magnet and a coil. The coil can correspond to the magnet, and one of the magnet and the coil can be disposed on the rotation element. Therefore, it is favorable for utilizing the magnet and the coil to drive the rotation of the rotation element with respect to the positioning element so as to further drive the abovementioned rotation of the movable blades with respect to the positioning structures. Please refer to FIG. 4, which shows the magnets 142 disposed on the rotation element 141 and the coils 143 disposed on the positioning element 13 via the flexible circuit board 144 according to the 1st embodiment of the present disclosure. Alternatively, in some other embodiments of the present disclosure, the magnets can be disposed on the positioning element via the flexible circuit board, and the coils can be disposed on the rotation element, and the present disclosure is not limited thereto.

The driving part can further include at least two rollable elements disposed between the rotation element and a substrate so as to support the rotation of the rotation element. Therefore, it is favorable for improving the rotation stability of the rotation element. Moreover, the number of the rollable elements can be two, three, four, or more, and the present disclosure is not limited thereto. Moreover, the number of the rollable elements can be five or less. Therefore, it is favorable for maintaining the manufacturing yield rate. Moreover, each rollable element can be a spherical element. Moreover, the positioning element can be used as the substrate in some other embodiments of the present disclosure, and the present disclosure is not limited thereto. Please refer to FIG. 4 and FIG. 12, which show four spherical rollable elements 145 located between the rotation element 141 and the substrate 11 according to the 1st embodiment of the present disclosure.

Each rollable element can have a plurality of contact points that can be in physical contact with the rotation element or the substrate. The contact points can have an inner contact point, an outer contact point, an upper contact point and a lower contact point. The inner contact point can be located closer to the optical axis than the other contact points. The outer contact point can be located farther away from the optical axis than the other contact points. The upper contact point can be one of two contact points that are most spaced apart from each other in a direction parallel to the optical axis among all contact points. The lower contact point can be the other one of the two contact points that are most spaced apart from each other in the direction parallel to the optical axis among all contact points. With the arrangement of contact points, it is favorable for performing alignment between the rotation element and the substrate so as to maintain the positions thereof during the rotation of the rotation element. Specifically, the alignment through the inner contact point and the outer contact point helps to maintain the radial positions of the rotation element and the substrate, and the alignment through the upper contact point and the lower contact point helps to maintain the axial positions of the rotation element and the substrate. Moreover, the number of all contact points can be four. Alternatively, the number of all contact points can be three. When the number of all contact points is three, one of the inner contact point and the outer contact point and one of the upper contact point and the lower contact point among all contact points can be the same contact point. Please refer to FIG. 14, FIG. 16, FIG. 17 and FIG. 18, which respectively show four contact points 2450, 4450, 5450 and 6450 according to the 2nd, 4th, 5th, and 6th embodiments of the present disclosure, and each four contact points 2450, 4450, 5450 or 6450 have one separated inner contact point 2451, 4451, 5451 or 6451, one separated outer contact point 2452, 4452, 5452 or 6452, one separated upper contact point 2453, 4453, 5453 or 6453, and one separated lower contact point 2454, 4454, 5454 or 6454. Please refer to FIG. 15, which shows three contact points 3450 according to the 3rd embodiment of the present disclosure, and the three contact points 3450 have one inner contact point 3451, the outer contact point 3452 and the upper contact point 3453 as the same contact point, and one lower contact point 3454.

When a distance perpendicular to the optical axis between the inner contact point and the outer contact point among all contact points is Dt, and a distance perpendicular to the optical axis between the inner contact point and the remaining contact point among all contact points is Di, the following condition can be satisfied: $0.3 \leq Di/Dt \leq 0.7$. Therefore, it is favorable for balancing the force applied on the rollable element so as to ensure dynamic stability of elements during the rotation of the rotation element. Please be noted that the definition of "the remaining contact point" in Di is the lower contact point when the number of all contact points is four; the definition of "the remaining contact point" in Di is a contact point instead of the abovementioned inner and outer contact points, which may be the upper contact point or the lower contact point, when the number of all contact points is three. Please refer to FIG. 14, which shows Dt and Di according to the 2nd embodiment of the present disclosure, the number of the contact points 2450 is four, and therefore Di is the distance perpendicular to the optical axis OA between the inner contact point 2451 and the lower contact point 2454. Please refer to FIG. 15, which show Dt and Di according to the 3rd embodiment of the present disclosure, the number of the contact points 3450 is three, and Di is the distance perpendicular to the optical axis OA between the inner contact point 3451 and the lower contact point 3454 instead of the inner and outer contact points 3451 and 3452.

The variable aperture module defines an f-number of the imaging lens. When the f-number of the imaging lens is Fno, the following condition can be satisfied: $0.65 \leq Fno \leq 6.2$. Therefore, it is favorable for adjusting the f-number of the imaging lens through the variable aperture module, such that the imaging lens is suitable for various photographing scenarios.

The present disclosure also provides an electronic device that includes the abovementioned imaging lens module.

According to the present disclosure, the aforementioned features and conditions can be utilized in numerous combinations so as to achieve corresponding effect.

According to the above description of the present disclosure, the following specific embodiments are provided for further explanation.

1st Embodiment

Figure 2:
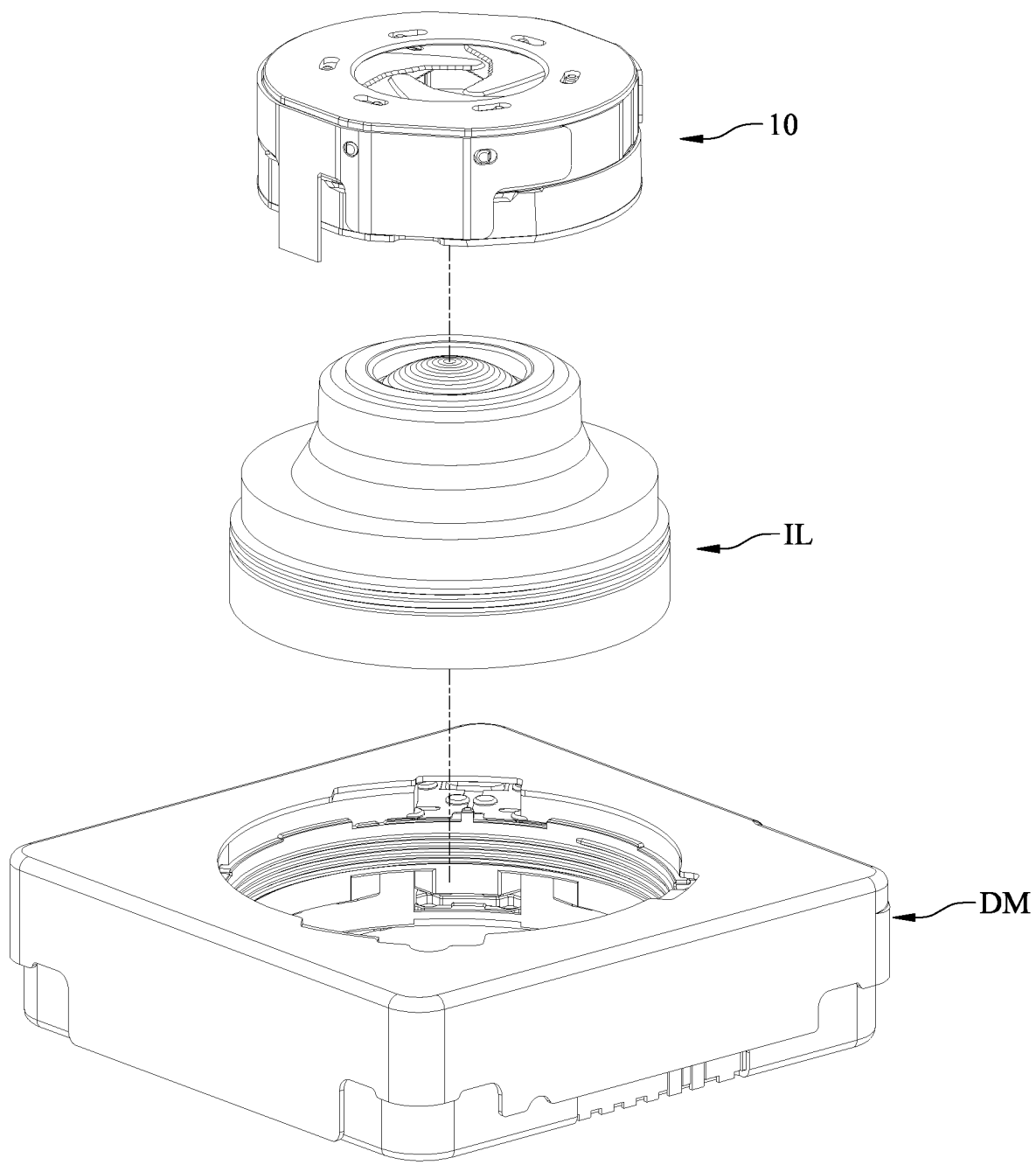
FIG. 2 is an exploded view of the imaging lens module in FIG. 1.
Figure 3:
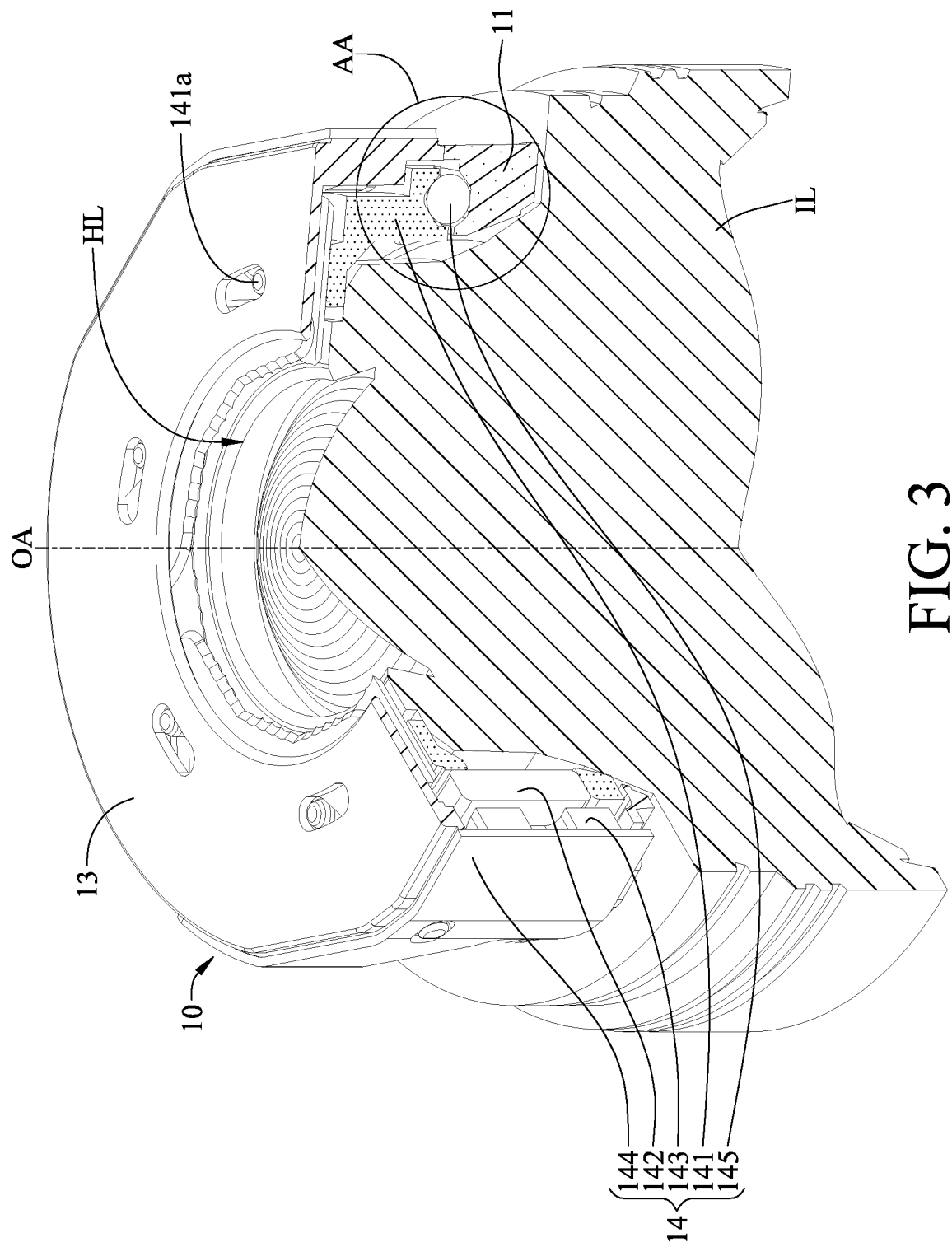
FIG. 3 is a perspective view of several elements of the imaging lens module in FIG. 1 that have been sectioned.

Please refer to FIG. 1 to FIG. 3, where FIG. 1 is a perspective view of an imaging lens module according to the 1st embodiment of the present disclosure, FIG. 2 is an exploded view of the imaging lens module in FIG. 1, and FIG. 3 is a perspective view of several elements of the imaging lens module in FIG. 1 that have been sectioned.

An imaging lens module 1 provided in this embodiment includes a variable aperture module 10, an imaging lens IL and an imaging lens driving module DM. The variable aperture module 10 and the imaging lens IL are disposed along an optical axis OA. The imaging lens IL includes a lens barrel (not numbered) and at least one optical element (not numbered) such as an imaging lens element that is accommodated in the lens barrel. Note that the shapes of the lens barrel and the at least one optical element are not intended to restrict the present disclosure, their contours illustrated in the drawings may not in compliance with the actual products, and the cross section of the at least one optical element in FIG. 3 is schematically illustrated for preventing obscuring the subject matter of the present disclosure. The imaging lens driving module DM accommodates the imaging lens IL and provides the imaging lens IL with a function of optical stability or auto focus.

Figure 4:
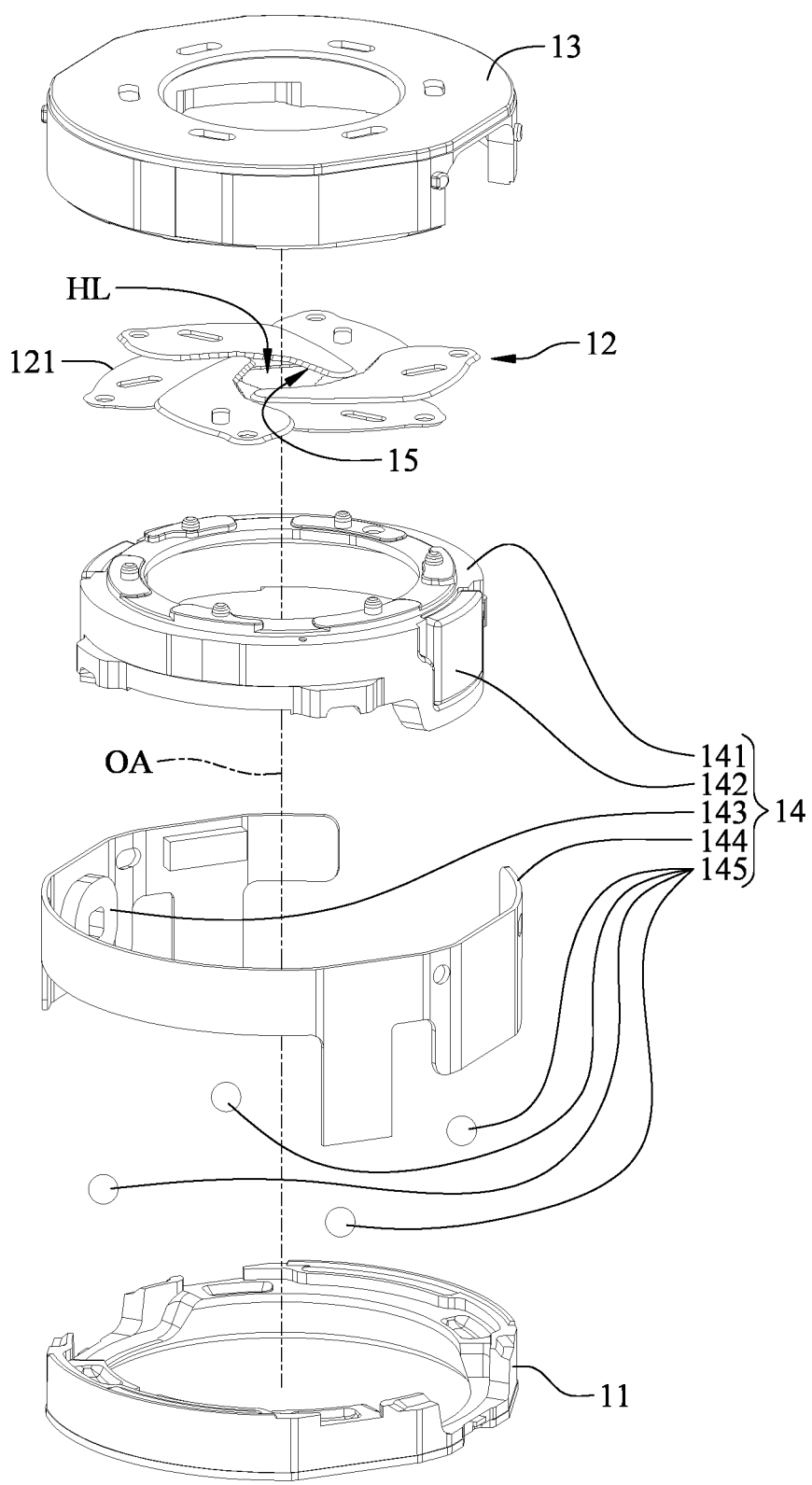
FIG. 4 is an exploded view of a variable aperture module of the imaging lens module in FIG. 2.
Figure 5:
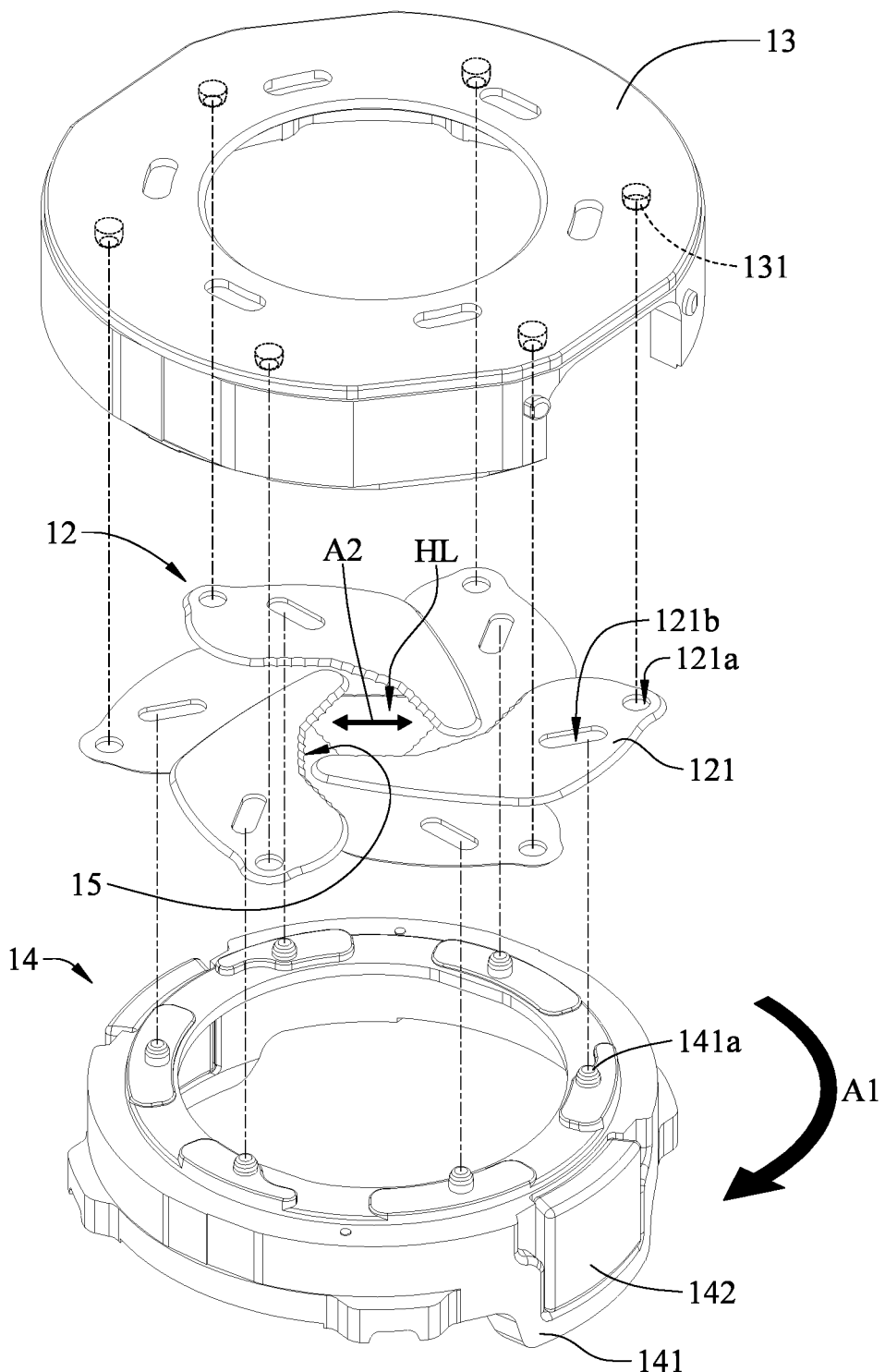
FIG. 5 is a schematic view showing correspondence relationship of several elements of the variable aperture module in FIG. 4.
Figure 6:
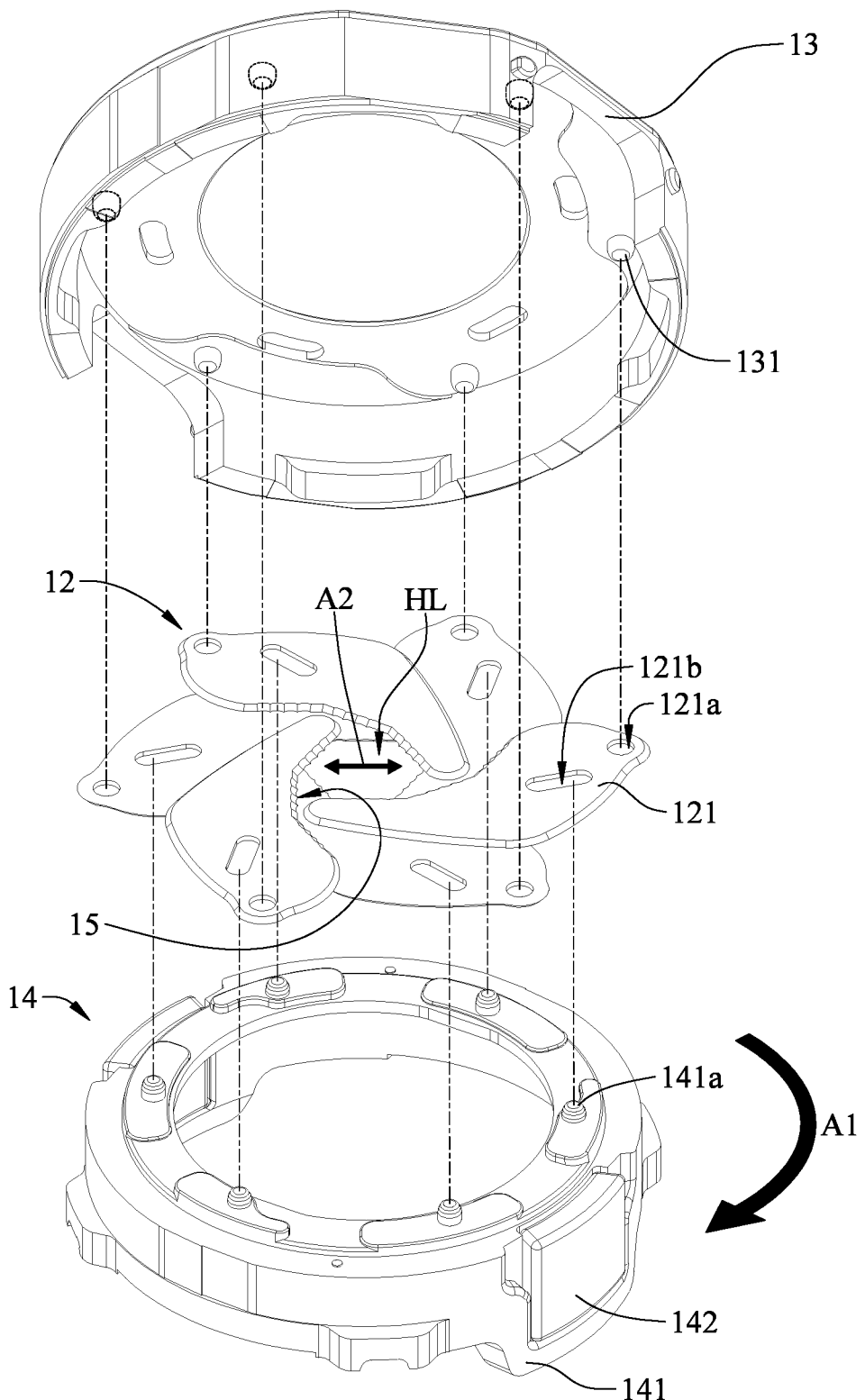
FIG. 6 is another schematic view showing correspondence relationship of several elements of the variable aperture module in FIG. 4.
Figure 7:
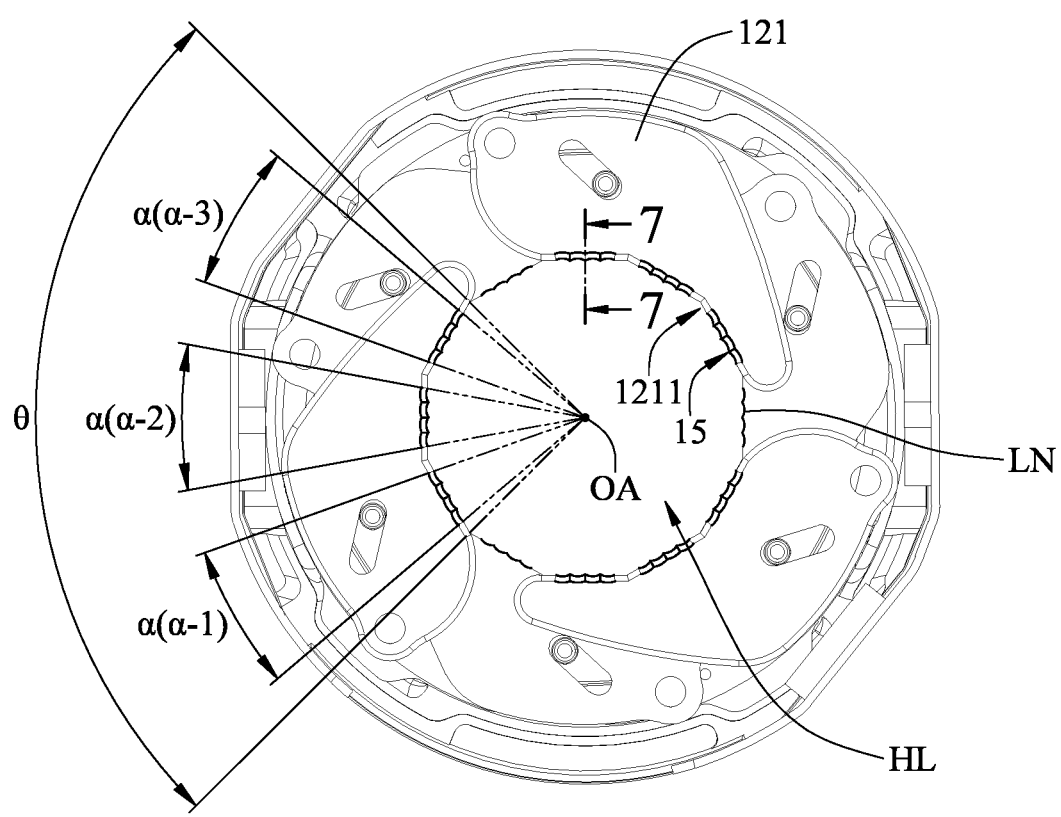
FIG. 7 is a top view of the variable aperture module of the imaging lens module in FIG. 2 in the case that a light passable hole of the variable aperture module is in its maximum hole size state.
Figure 8:
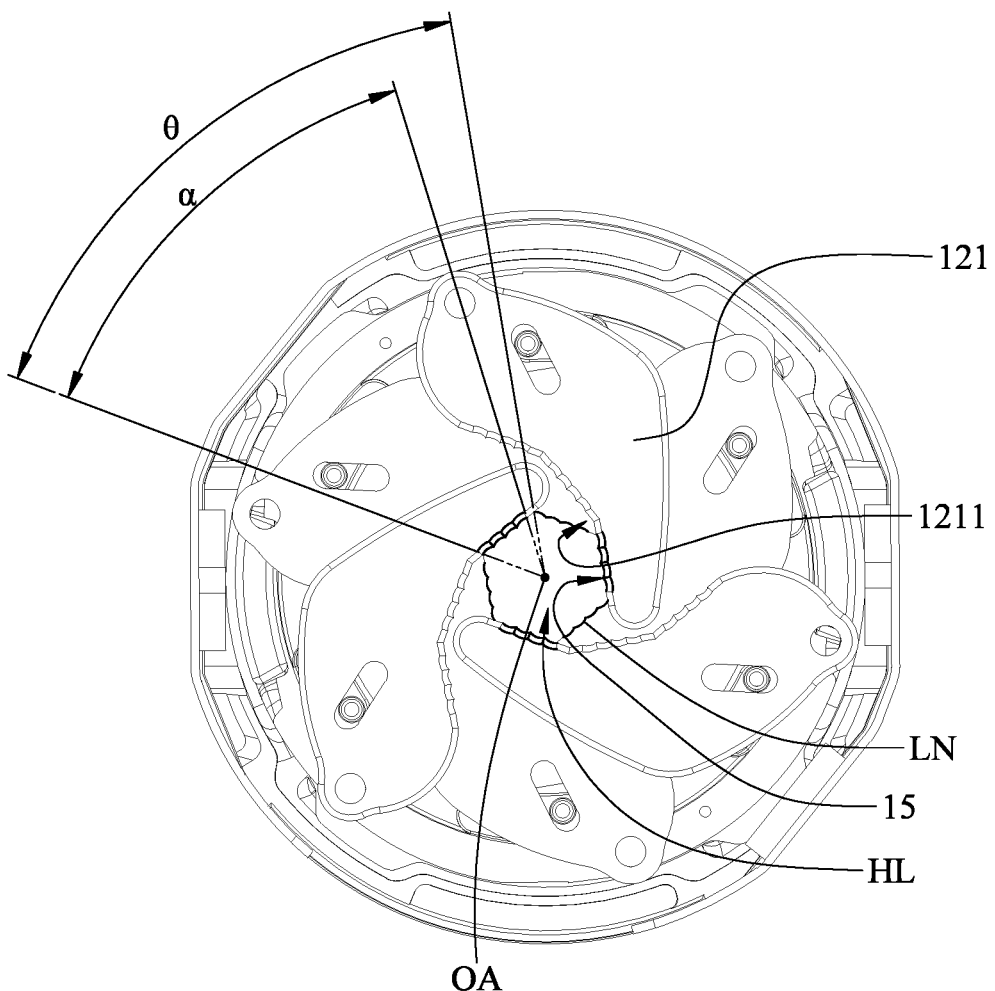
FIG. 8 is a top view of the variable aperture module in FIG. 7 in the case that the light passable hole is in its minimum hole size state.
Figure 9:
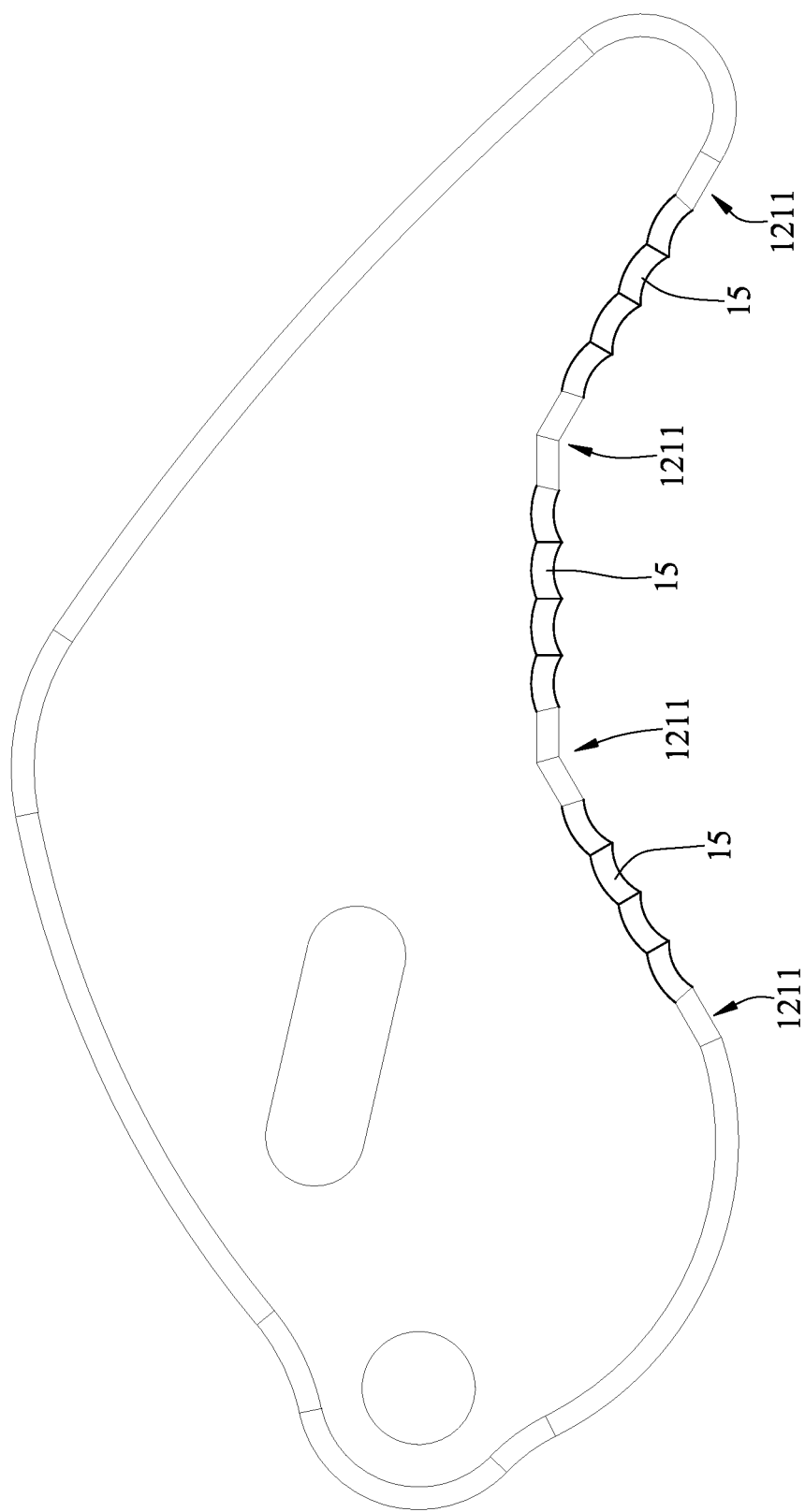
FIG. 9 is a top view of a movable blade of the variable aperture module in FIG. 7.

Please further refer to FIG. 4 to FIG. 11, where FIG. 4 is an exploded view of a variable aperture module of the imaging lens module in FIG. 2, FIG. 5 is a schematic view showing correspondence relationship of several elements of the variable aperture module in FIG. 4, FIG. 6 is another schematic view showing correspondence relationship of several elements of the variable aperture module in FIG. 4, FIG. 7 is a top view of the variable aperture module of the imaging lens module in FIG. 2 in the case that a light passable hole of the variable aperture module is in its maximum hole size state, FIG. 8 is a top view of the variable aperture module in FIG. 7 in the case that the light passable hole is in its minimum hole size state, FIG. 9 is a top view of a movable blade of the variable aperture module in FIG.

Figure 10:
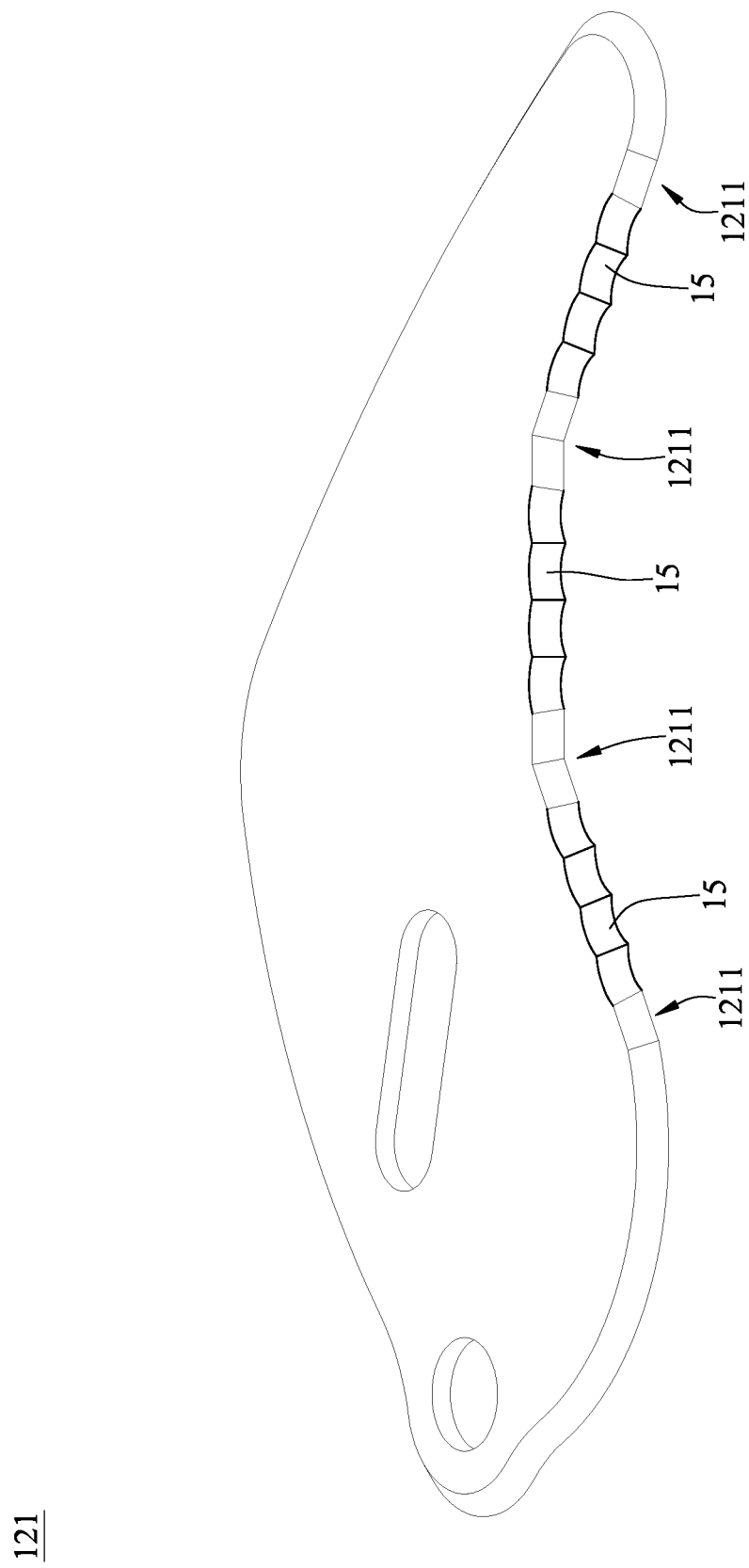
FIG. 10 is a perspective view of a movable blade of the variable aperture module in FIG. 7.
Figure 11:
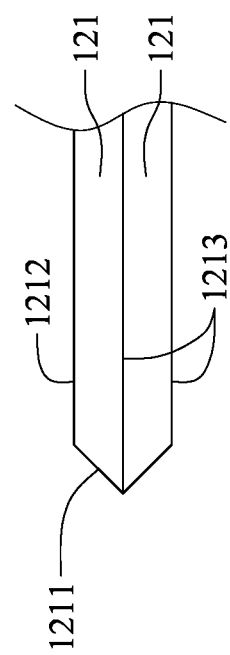
FIG. 11 is a partial and cross-sectional view of the variable aperture module in FIG. 7 along line 7-7.

7, FIG. 10 is a perspective view of a movable blade of the variable aperture module in FIG. 7, and FIG. 11 is a partial and cross-sectional view of the variable aperture module in FIG. 7 along line 7-7.

The variable aperture module 10 includes a substrate 11, a blade assembly 12, a positioning element 13, a driving part 14 and a plurality of matte structures 15.

The blade assembly 12 is disposed on the substrate 11 via the driving part 14. The blade assembly 12 includes a plurality of movable blades 121 that surround the optical axis OA and form a light passable hole HL with adjustable size for different hole size states, such that light enters into the imaging lens IL via the light passable hole HL of the variable aperture module 10, and the variable aperture module 10 in each hole size state defines an f-number of the imaging lens IL. Each movable blade 121 is a single-layer structure of a uniform material, as shown in FIG. 11.

Each movable blade 121 has an inner surface 1211, as shown in FIG. 9 and FIG. 10. The inner surfaces 1211 of the plurality of movable blades 121 are configured to define a contour of the light passable hole HL in each hole size state observed along the optical axis OA, as shown in FIG. 7 and FIG. 8.

Each movable blade 121 further has a first surface 1212 and a second surface 1213. The first surface 1212 is perpendicular to the optical axis OA, the second surface 1213 corresponds to the first surface 1212, and the inner surface 1211 is connected to and located between the first surface 1212 and the second surface 1213, as shown in FIG. 11. There is a single-chamfer formed on the inner surface 1211 connected to and located between the first surface 1212 and the second surface 1213, such that the distance between the inner surface 1211 and the optical axis OA is gradually reduced along a direction parallel to the optical axis OA from the first surface 1212 to the second surface 1213.

The positioning element 13 is disposed on the blade assembly 12. Specifically, the positioning element 13 includes a plurality of positioning structures 131. The positioning structures 131 and positioning holes 121a of the movable blades 121 are disposed to respectively match each other in size, as shown in FIG. 5 and FIG. 6.

The driving part 14 is disposed on the substrate 11. The driving part 14 includes a rotation element 141 that is rotatable with respect to the positioning element 13. The rotation element 141 has a plurality of protrusions 141a movably disposed in grooves 121b of the movable blades 121. Accordingly, the rotation element 141 is able to rotate the movable blades 121 with respect to the positioning structures 131, respectively, so as to adjust a size of the light passable hole HL, as shown in FIG. 5 and FIG. 6. Moreover, when the rotation element 141 clockwise rotates with respect to the positioning element 13 (as indicated by arrows A1 in FIG. and FIG. 6), the movable blades 121 are driven to respectively rotate with respect to the positioning structures 131, such that the mount angles of the movable blades 121 are changed, thereby increasing the size of the light passable hole HL (as indicated by arrows A2 in FIG. 5 and FIG. 6). Conversely, when the rotation element 141 counterclockwise rotates with respect to the positioning element 13, the size of the light passable hole HL is reduced. Please be noted that FIG. 5 and FIG. 6 are schematically illustrated in multiple perspectives for better showing the mount correspondence relationship of the blade assembly 12, the positioning element 13 and the driving part 14.

The driving part 14 further includes two magnets 142, two coils 143 and a flexible circuit board 144. The magnets 142 are respectively disposed in two recesses (not numbered) of the rotation element 141. The coils 143 are disposed on the positioning element 13 via the flexible circuit board 144 so as to respectively correspond to the magnets 142. The magnets 142 and the coils 143 generate an interaction force therebetween to rotate the rotation element 141 with respect to the positioning element 13 for achieving the abovementioned rotation of the movable blades 121 with respect to the positioning structures 131 so as to adjust the size of the light passable hole HL.

The matte structures 15 is disposed on the inner surface 1211 of one movable blade 121 in a manner of being made in one piece with the one movable blade 121, as shown in FIG. 9 and FIG. 10. Each matte structure 15 is single structure extending towards the optical axis OA, such that at least part of the contour of the light passable hole HL has an undulating shape at least in several hole size states. Moreover, the contour of the light passable hole HL represents a polygon with a plurality of lines LN, and at least part of the lines LN represented by the contour of the light passable hole HL is non-linear at least in several hole size states, as the dodecagon contour with twelve non-linear lines LN having undulating shapes of the light passable hole HL shown in FIG. 7, or as the hexagon contour with six non-linear lines LN having undulating shapes of the light passable hole HL shown in FIG. 8.

In each movable blade, a ratio of a first central angle subtended from the optical axis OA by at least part of the contour of the light passable hole HL on which the plurality of matte structures 15 are located to a second central angle subtended from the optical axis OA by at least part of the contour of the light passable hole HL on which the inner surface 1211 is located is variable according to the adjustment of the size of the light passable hole HL.

Specifically, in each movable blade 121, the first central angle subtended from the optical axis OA by at least part of the contour of the light passable hole HL on which the plurality of matte structures 15 are located is indicated by "α", and the second central angle subtended from the optical axis OA by at least part of the contour of the light passable hole HL on which the inner surface 1211 is located is indicated by "θ". The size of the light passable hole HL is variable by movement of the movable blades 121, so that the light passable hole HL may be in a maximum hole size state with large light passable hole, or in a minimum hole size state with small light passable hole. When the light passable hole HL is in the maximum hole size state, as shown in FIG. 7, the following condition is satisfied: $(\alpha/\theta) \times 100\% = 69\%$, wherein α includes α-1, α-2 and α-3 with the same value. When the light passable hole HL is in the minimum hole size state, as shown in FIG. 8, the following condition is satisfied: $(\alpha/\theta) \times 100\% = 88\%$. Note that the abovementioned ratio $((\alpha/\theta) \times 100\%)$ becomes greater as the size of the light passable hole HL becomes smaller.

With the variation of the size of the light passable hole HL, the f-number of the imaging lens IL is also adjustable. The f-number of the imaging lens IL is indicated by "Fno". When the light passable hole HL is in the maximum hole size state, as shown in FIG. 7, the following condition is satisfied: Fno=1.4. When the light passable hole HL is in the minimum hole size state, as shown in FIG. 8, the following condition is satisfied: Fno=4.0.

Figure 12:
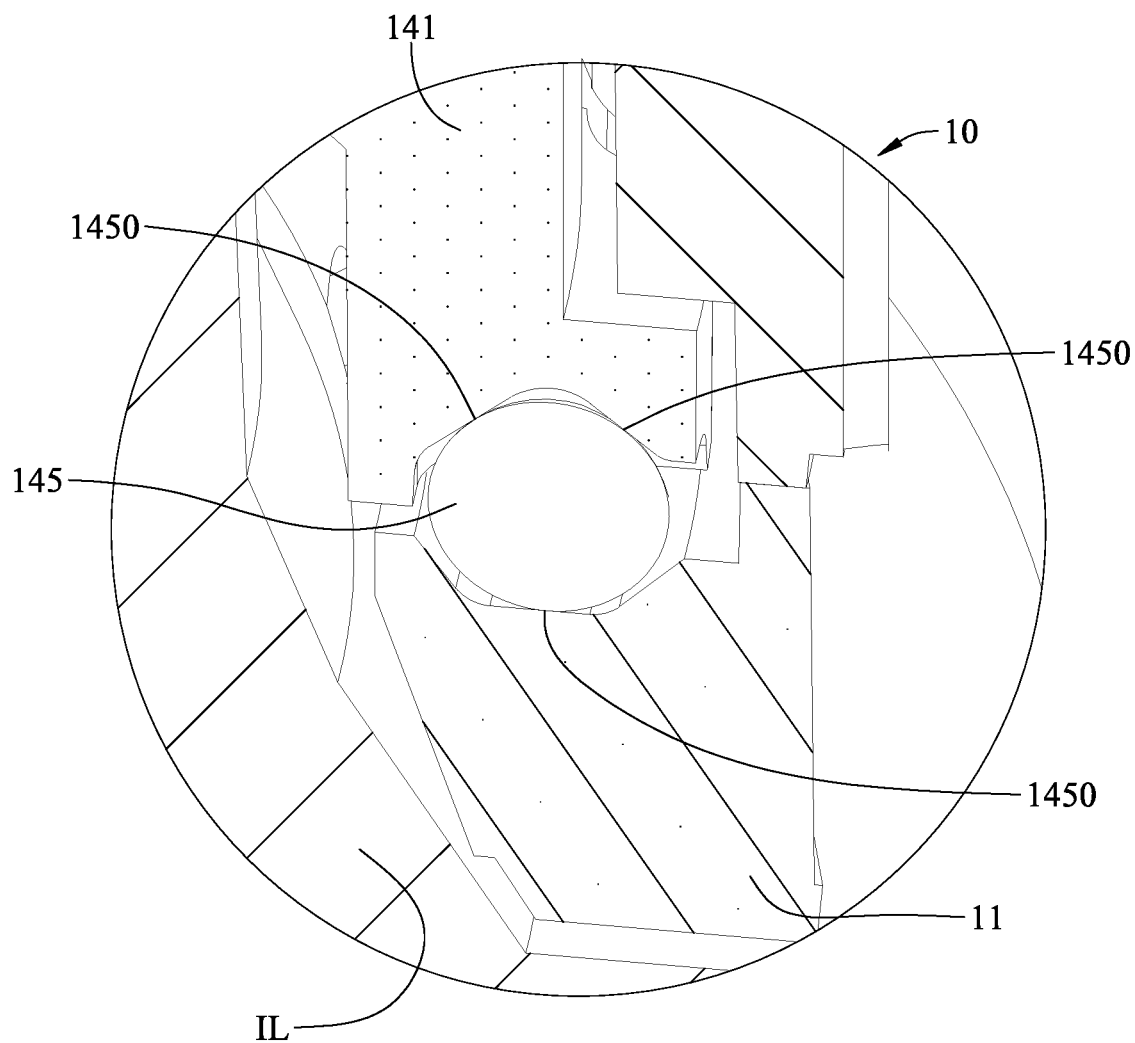
FIG. 12 is an enlarged view of AA region in FIG. 3.

Please refer to FIG. 3 and FIG. 4 and further refer to FIG. 12, where FIG. 12 is an enlarged view of AA region in FIG. 3.

As shown in FIG. 4, the driving part 14 further includes four spherical rollable elements 145. As shown in FIG. 3 and FIG. 12, the rollable elements 145 are disposed between the rotation element 141 and the substrate 11 so as to support the rotation of the rotation element 141. The rollable elements 145 each have a plurality of contact points 1450 in physical contact with the rotation element 141 and the substrate 11.

The mean of the contact points 1450 of the rollable element 145 in physical contact with the rotation element 141 and the substrate 11 illustrated in the drawings referring to this embodiment is not intended to restrict the present disclosure. In the following embodiments, different means of the rollable element in physical contact with the rotation element and the substrate through the contact points are further described.

2nd Embodiment

Figure 13:
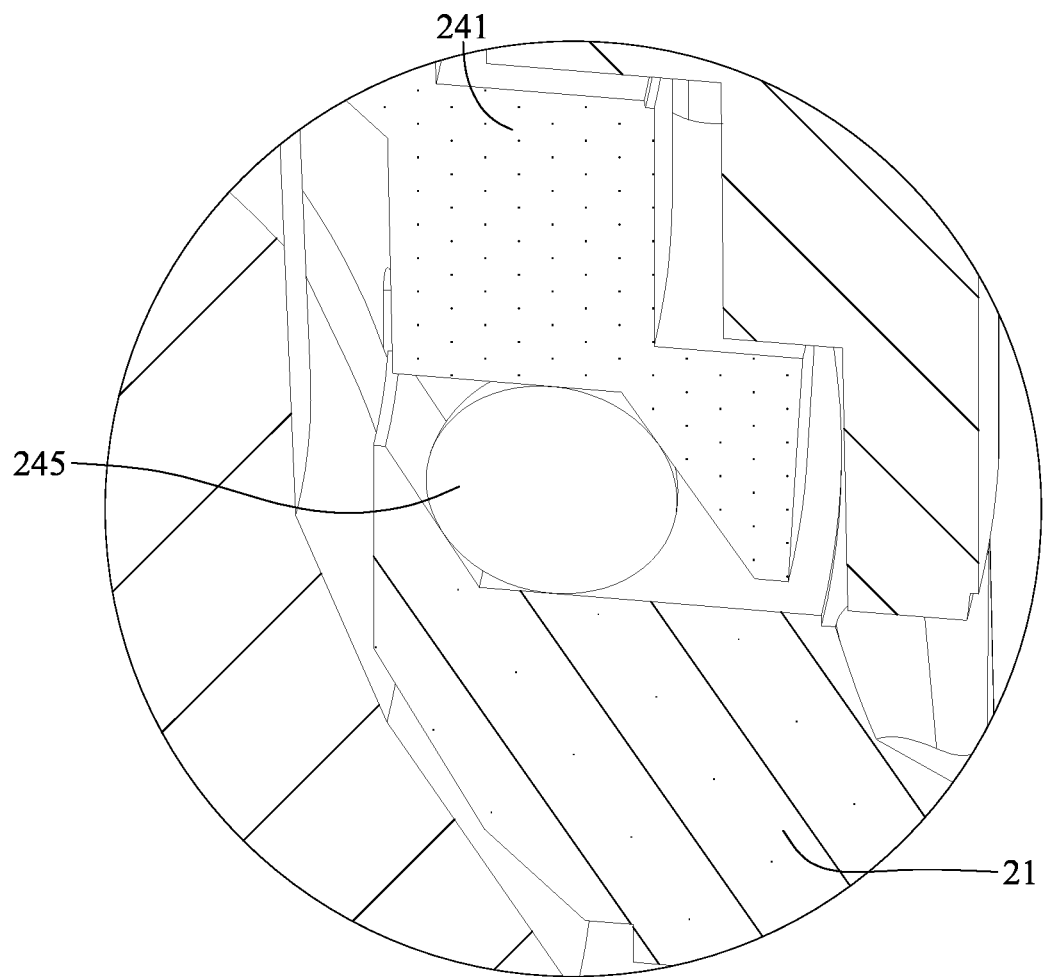
FIG. 13 is a partial and enlarged view of an imaging lens module according to the 2nd embodiment of the present disclosure.
Figure 14:
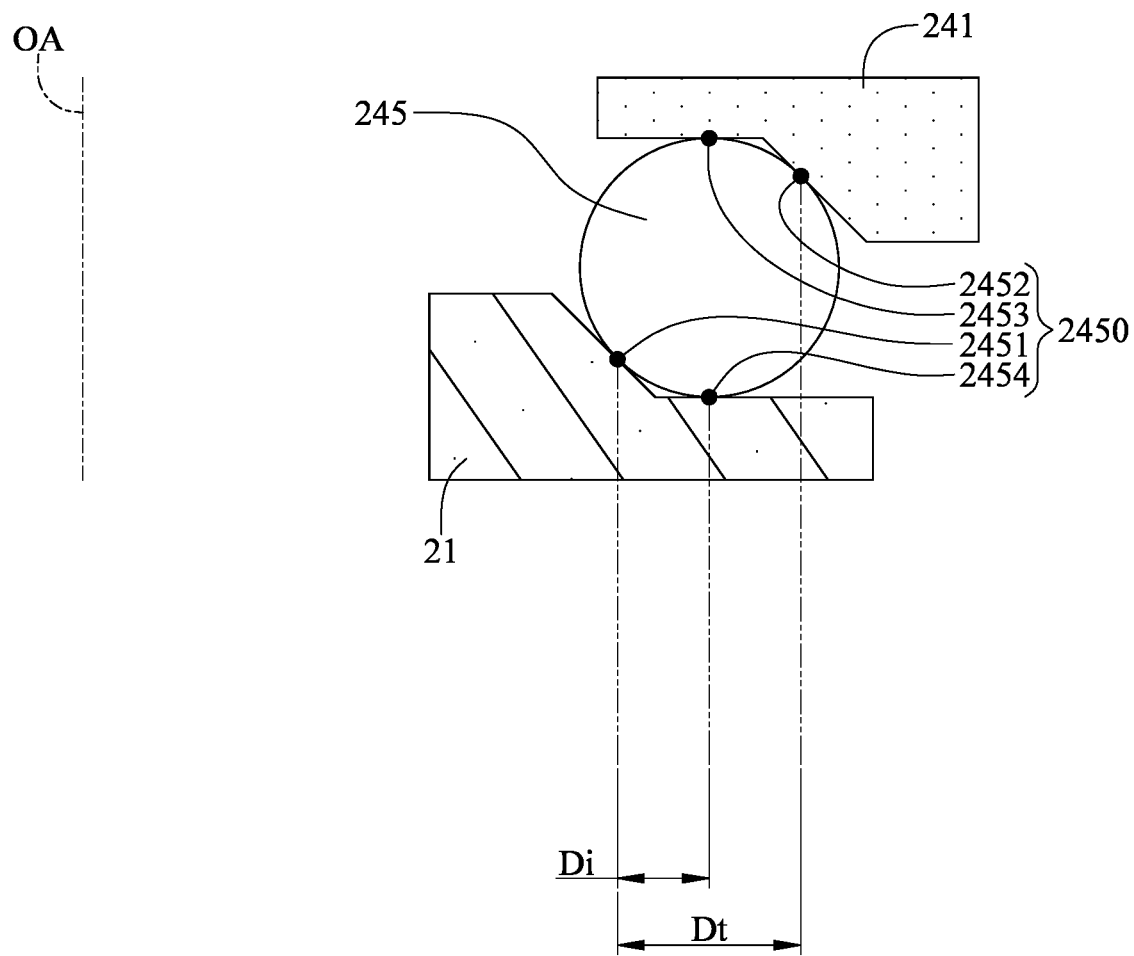
FIG. 14 is a schematic view showing correspondence relationship of several elements of the imaging lens module in FIG. 13.

Please refer to FIG. 13 and FIG. 14, where FIG. 13 is a partial and enlarged view of an imaging lens module according to the 2nd embodiment of the present disclosure, and FIG. 14 is a schematic view showing correspondence relationship of several elements of the imaging lens module in FIG. 13. Please be noted that FIG. 14 is schematically illustrated for better showing the physical contact relationship of the contact points with adjacent elements, and the contours of the adjacent elements may not in compliance with the actual production.

An imaging lens module (not numbered) provided in this embodiment is substantially similar to the imaging lens module 1 of the 1st embodiment in structure. Only difference between this and the 1st embodiments together with description relating to essential structure will be illustrated hereinafter.

As shown in FIG. 13 and FIG. 14, the spherical rollable element 245 is disposed between the rotation element 241 and the substrate 21. The rollable element 245 has a plurality of contact points 2450 in physical contact with the rotation element 241 and the substrate 21. The contact points 2450 have four contact points, which are an inner contact point 2451, an outer contact point 2452, an upper contact point 2453 and a lower contact point 2454. The inner contact point 2451 is located closer to the optical axis OA than the other contact points and is in physical contact with the substrate 21 at the lower left side of the rollable element 245 depicted in FIG. 14. The outer contact point 2452 is located farther away from the optical axis OA than the other contact points and is in physical contact with the rotation element 241 at the upper right side of the rollable element 245 depicted in FIG. 14. The upper contact point 2453 is one of two contact points that are most spaced apart from each other in a direction parallel to the optical axis OA among the contact points 2450 and is in physical contact with the rotation element 241 at the upper side of the rollable element 245 depicted in FIG. 14. The lower contact point 2454 is the other one of the two contact points that are most spaced apart from each other in the direction parallel to the optical axis OA among the contact points 2450 and is in physical contact with the substrate 21 at the lower side of the rollable element 245 depicted in FIG. 14.

When a distance perpendicular to the optical axis OA between the inner contact point 2451 and the outer contact point 2452 among the contact points 2450 is Dt, and a distance perpendicular to the optical axis OA between the inner contact point 2451 and the lower contact point 2454 among the contact points 2450 is Di, the following condition is satisfied: $Di/Dt=0.5$.

3rd Embodiment

Figure 15:
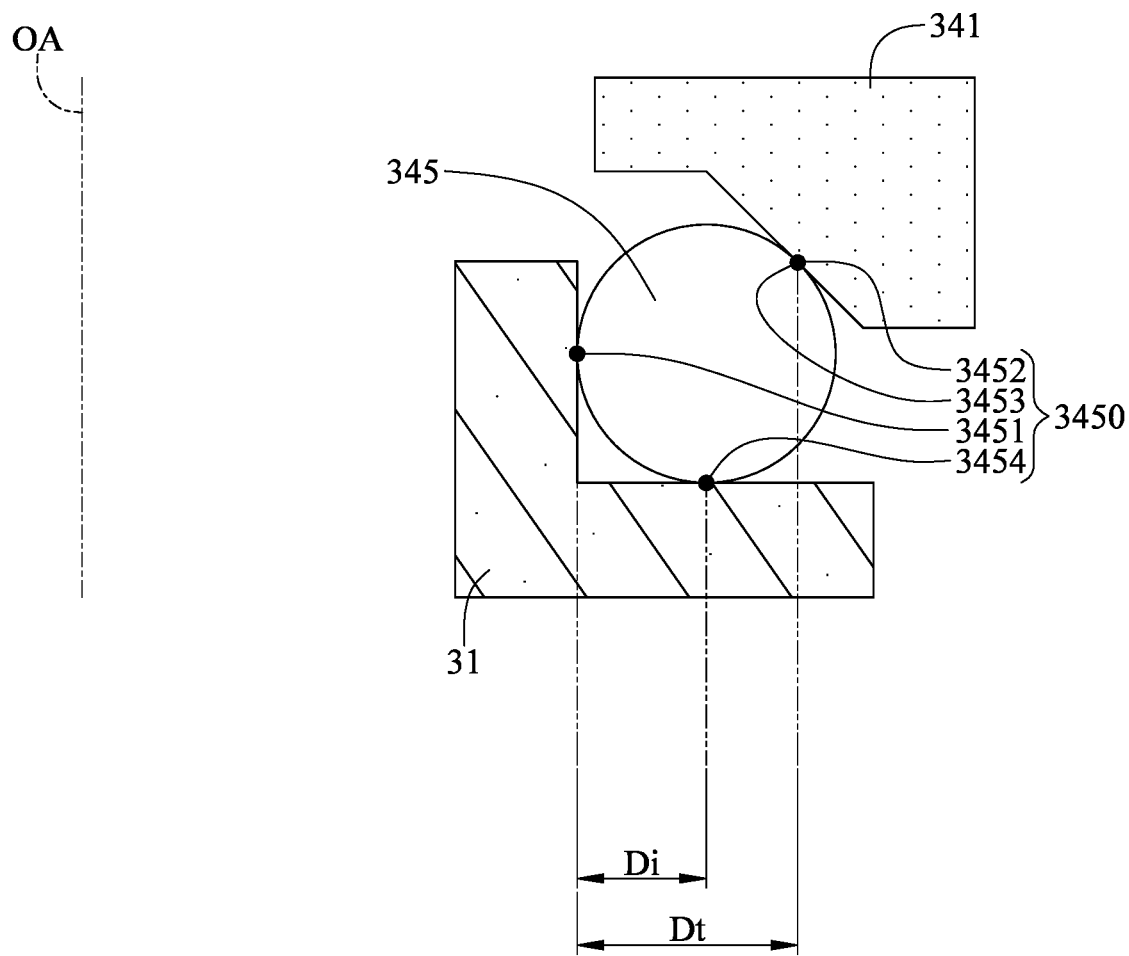
FIG. 15 is a schematic view showing correspondence relationship of several elements of the imaging lens module according to the 3rd embodiment of the present disclosure.

Please refer to FIG. 15, which is a schematic view showing correspondence relationship of several elements of the imaging lens module according to the 3rd embodiment of the present disclosure. Please be noted that FIG. 15 is schematically illustrated for better showing the physical contact relationship of the contact points with adjacent elements, and the contours of the adjacent elements may not in compliance with the actual production.

An imaging lens module (not numbered) provided in this embodiment is substantially similar to the imaging lens module 1 of the 1st embodiment in structure. Only difference between this and the 1st embodiments together with description relating to essential structure will be illustrated hereinafter.

As shown in FIG. 15, the spherical rollable element 345 is disposed between the rotation element 341 and the substrate 31. The rollable element 345 has a plurality of contact points 3450 in physical contact with the rotation element 341 and the substrate 31. The contact points 3450 have three contact points, which are an outer contact point 3452 and an upper contact point 3453 as the same contact point, an inner contact point 3451, and a lower contact point 3454. The inner contact point 3451 is located closer to the optical axis OA than the other contact points and is in physical contact with the substrate 31 at the left side of the rollable element 345 depicted in FIG. 15. The outer contact point 3452, or the upper contact point 3453, is one of two contact points that are most spaced apart from each other in a direction parallel to the optical axis OA among the contact points 3450, is located farther away from the optical axis OA than the other contact points, and is in physical contact with the rotation element 341 at the upper right side of the rollable element 345 depicted in FIG. 15. The lower contact point 3454 is the other one of the two contact points that are most spaced apart from each other in the direction parallel to the optical axis OA among the contact points 3450 and is in physical contact with the substrate 31 at the lower side of the rollable element 345 depicted in FIG. 15.

When a distance perpendicular to the optical axis OA between the inner contact point 3451 and the outer contact point 3452 among the contact points 3450 is Dt, and a distance perpendicular to the optical axis OA between the inner contact point 3451 and the lower contact point 3454 among the contact points 3450 is Di, the following condition is satisfied: $Di/Dt=0.59$.

4th Embodiment

Figure 16:
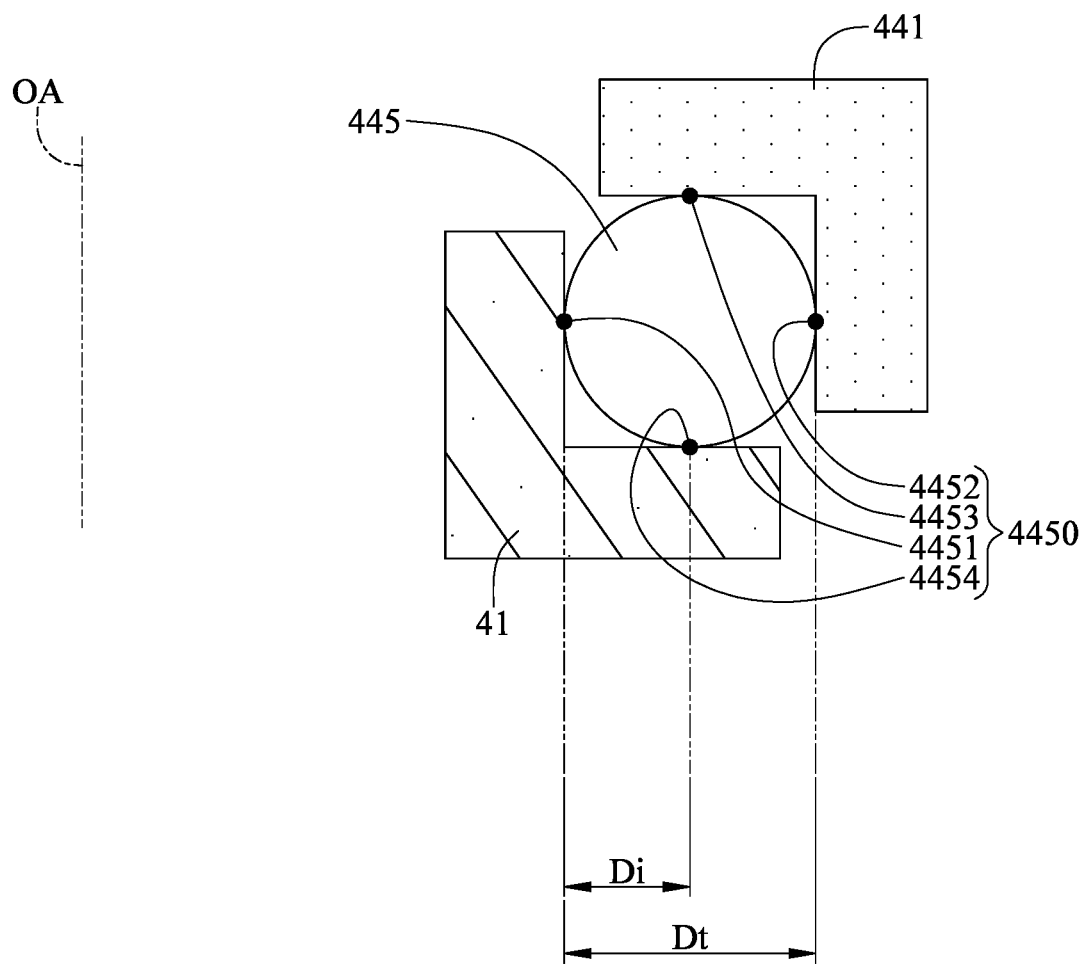
FIG. 16 is a schematic view showing correspondence relationship of several elements of the imaging lens module according to the 4th embodiment of the present disclosure.

Please refer to FIG. 16, which is a schematic view showing correspondence relationship of several elements of the imaging lens module according to the 4th embodiment of the present disclosure. Please be noted that FIG. 16 is schematically illustrated for better showing the physical contact relationship of the contact points with adjacent elements, and the contours of the adjacent elements may not in compliance with the actual production.

An imaging lens module (not numbered) provided in this embodiment is substantially similar to the imaging lens module 1 of the 1st embodiment in structure. Only difference between this and the 1st embodiments together with description relating to essential structure will be illustrated hereinafter.

As shown in FIG. 16, the spherical rollable element 445 is disposed between the rotation element 441 and the substrate 41. The rollable element 445 has a plurality of contact points 4450 in physical contact with the rotation element 441 and the substrate 41. The contact points 4450 have four contact points, which are an inner contact point 4451, an outer contact point 4452, an upper contact point 4453 and a lower contact point 4454. The inner contact point 4451 is located closer to the optical axis OA than the other contact points and is in physical contact with the substrate 41 at the left side of the rollable element 445 depicted in FIG. 16. The outer contact point 4452 is located farther away from the optical axis OA than the other contact points and is in physical contact with the rotation element 441 at the right side of the rollable element 445 depicted in FIG. 16. The upper contact point 4453 is one of two contact points that are most spaced apart from each other in a direction parallel to the optical axis OA among the contact points 4450 and is in physical contact with the rotation element 441 at the upper side of the rollable element 445 depicted in FIG. 16. The lower contact point 4454 is the other one of the two contact points that are most spaced apart from each other in the direction parallel to the optical axis OA among the contact points 4450 and is in physical contact with the substrate 41 at the lower side of the rollable element 445 depicted in FIG. 16.

When a distance perpendicular to the optical axis OA between the inner contact point 4451 and the outer contact point 4452 among the contact points 4450 is Dt, and a distance perpendicular to the optical axis OA between the inner contact point 4451 and the lower contact point 4454 among the contact points 4450 is Di, the following condition is satisfied: Di/Dt=0.5.

5th Embodiment

Figure 17:
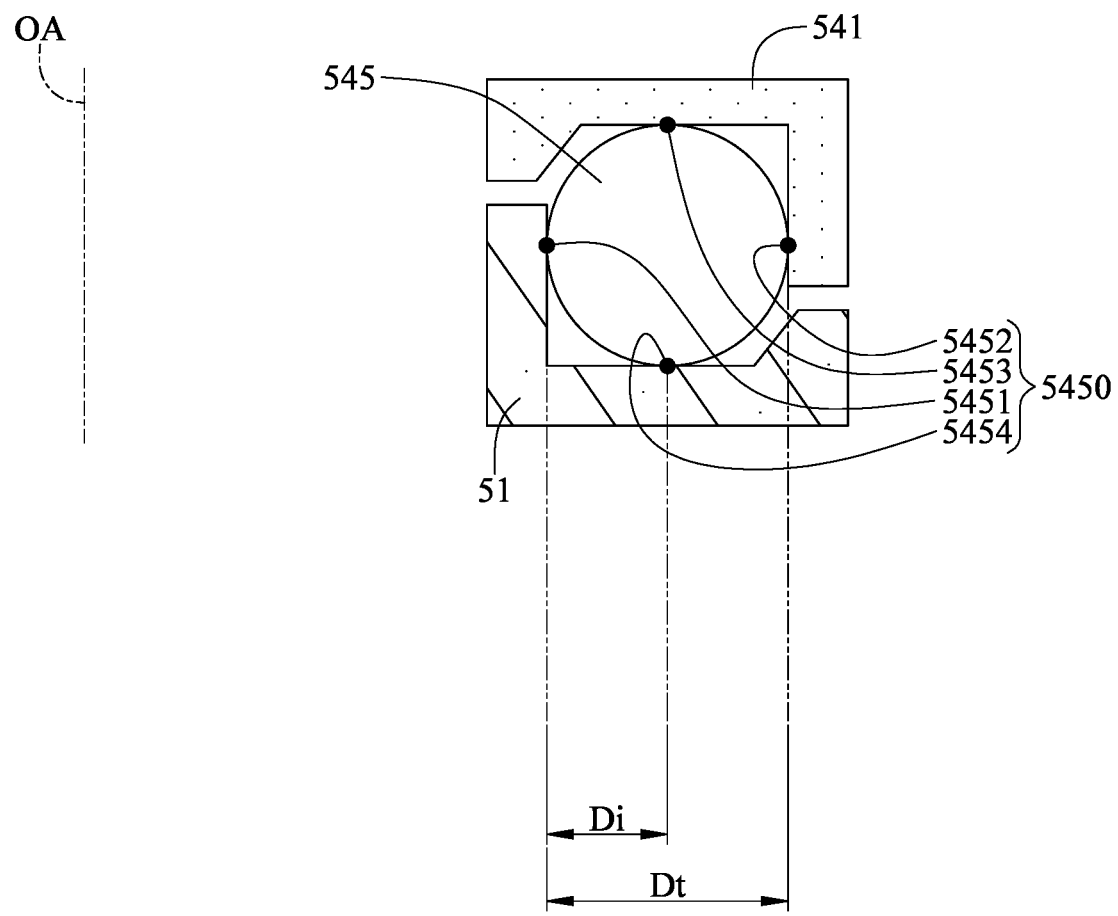
FIG. 17 is a schematic view showing correspondence relationship of several elements of the imaging lens module according to the 5th embodiment of the present disclosure.

Please refer to FIG. 17, which is a schematic view showing correspondence relationship of several elements of the imaging lens module according to the 5th embodiment of the present disclosure. Please be noted that FIG. 17 is schematically illustrated for better showing the physical contact relationship of the contact points with adjacent elements, and the contours of the adjacent elements may not in compliance with the actual production.

An imaging lens module (not numbered) provided in this embodiment is substantially similar to the imaging lens module 1 of the 1st embodiment in structure. Only difference between this and the 1st embodiments together with description relating to essential structure will be illustrated hereinafter.

As shown in FIG. 17, the spherical rollable element 545 is disposed between the rotation element 541 and the substrate 51. The rollable element 545 has a plurality of contact points 5450 in physical contact with the rotation element 541 and the substrate 51. The contact points 5450 have four contact points, which are an inner contact point 5451, an outer contact point 5452, an upper contact point 5453 and a lower contact point 5454. The inner contact point 5451 is located closer to the optical axis OA than the other contact points and is in physical contact with the substrate 51 at the left side of the rollable element 545 depicted in FIG. 17. The outer contact point 5452 is located farther away from the optical axis OA than the other contact points and is in physical contact with the rotation element 541 at the right side of the rollable element 545 depicted in FIG. 17. The upper contact point 5453 is one of two contact points that are most spaced apart from each other in a direction parallel to the optical axis OA among the contact points 5450 and is in physical contact with the rotation element 541 at the upper side of the rollable element 545 depicted in FIG. 17. The lower contact point 5454 is the other one of the two contact points that are most spaced apart from each other in the direction parallel to the optical axis OA among the contact points 5450 and is in physical contact with the substrate 51 at the lower side of the rollable element 545 depicted in FIG. 17.

When a distance perpendicular to the optical axis OA between the inner contact point 5451 and the outer contact point 5452 among the contact points 5450 is Dt, and a distance perpendicular to the optical axis OA between the inner contact point 5451 and the lower contact point 5454 among the contact points 5450 is Di, the following condition is satisfied: Di/Dt=0.5.

6th Embodiment

Figure 18:
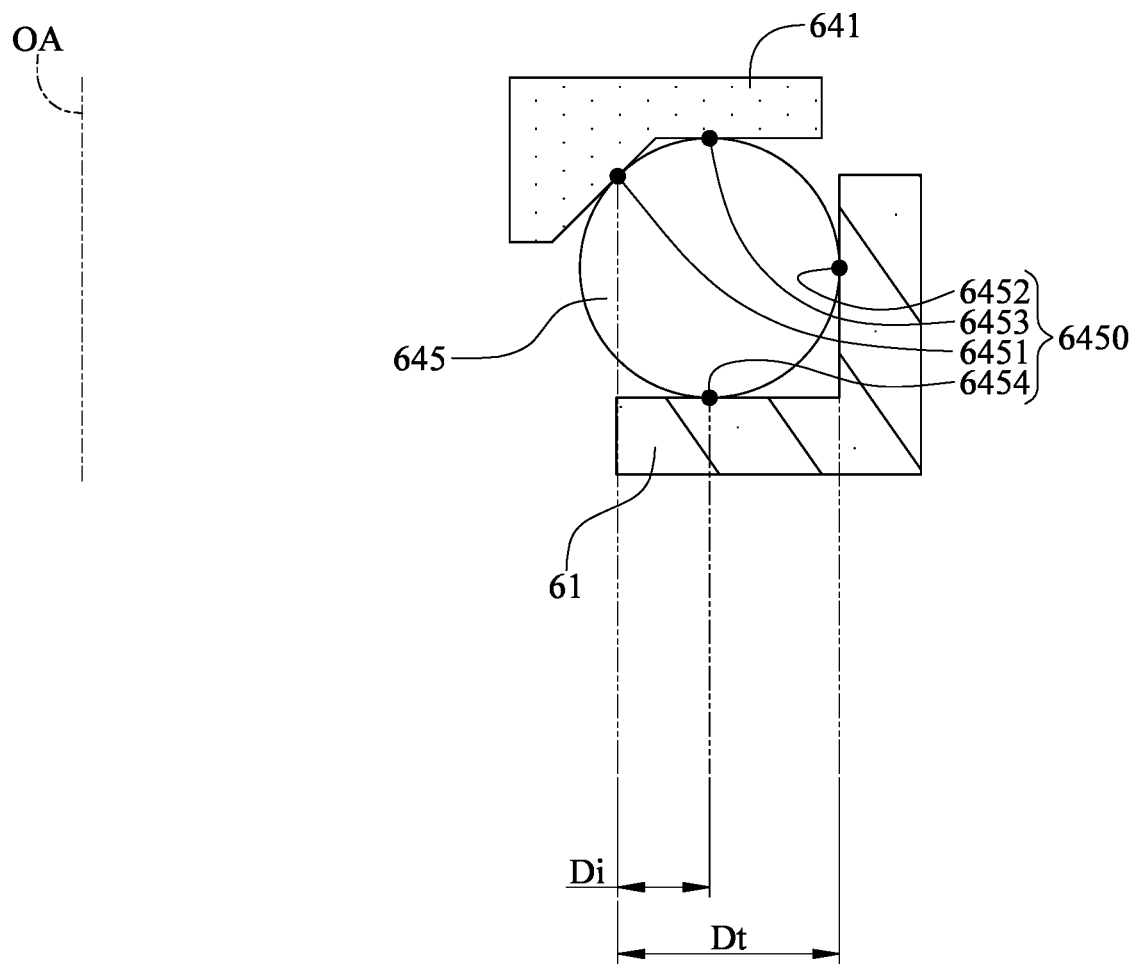
FIG. 18 is a schematic view showing correspondence relationship of several elements of the imaging lens module according to the 6th embodiment of the present disclosure.

Please refer to FIG. 18, which is a schematic view showing correspondence relationship of several elements of the imaging lens module according to the 6th embodiment of the present disclosure. Please be noted that FIG. 18 is schematically illustrated for better showing the physical contact relationship of the contact points with adjacent elements, and the contours of the adjacent elements may not in compliance with the actual production.

An imaging lens module (not numbered) provided in this embodiment is substantially similar to the imaging lens module 1 of the 1st embodiment in structure. Only difference between this and the 1st embodiments together with description relating to essential structure will be illustrated hereinafter.

As shown in FIG. 18, the spherical rollable element 645 is disposed between the rotation element 641 and the substrate 61. The rollable element 645 has a plurality of contact points 6450 in physical contact with the rotation element 641 and the substrate 61. The contact points 6450 have four contact points, which are an inner contact point 6451, an outer contact point 6452, an upper contact point 6453 and a lower contact point 6454. The inner contact point 6451 is located closer to the optical axis OA than the other contact points and is in physical contact with the rotation element 641 at the upper left side of the rollable element 645 depicted in FIG. 18. The outer contact point 6452 is located farther away from the optical axis OA than the other contact points and is in physical contact with the substrate 61 at the right side of the rollable element 645 depicted in FIG. 18. The upper contact point 6453 is one of two contact points that are most spaced apart from each other in a direction parallel to the optical axis OA among the contact points 6450 and is in physical contact with the rotation element 641 at the upper side of the rollable element 645 depicted in FIG. 18. The lower contact point 6454 is the other one of the two contact points that are most spaced apart from each other in the direction parallel to the optical axis OA among the contact points 6450 and is in physical contact with the substrate 61 at the lower side of the rollable element 645 depicted in FIG. 18.

When a distance perpendicular to the optical axis OA between the inner contact point 6451 and the outer contact point 6452 among the contact points 6450 is Dt, and a distance perpendicular to the optical axis OA between the inner contact point 6451 and the lower contact point 6454 among the contact points 6450 is Di, the following condition is satisfied: Di/Dt=0.41.

In the abovementioned embodiments, especially in the 1st embodiment, the matte structures 15 disposed on the inner surface 1211 of single movable blade 121 form three groups not connected to each other, but the present disclosure is not limited thereto. In the following embodiment, different arrangement of the matte structures on single movable blade is further described.

7th Embodiment

Figure 19:
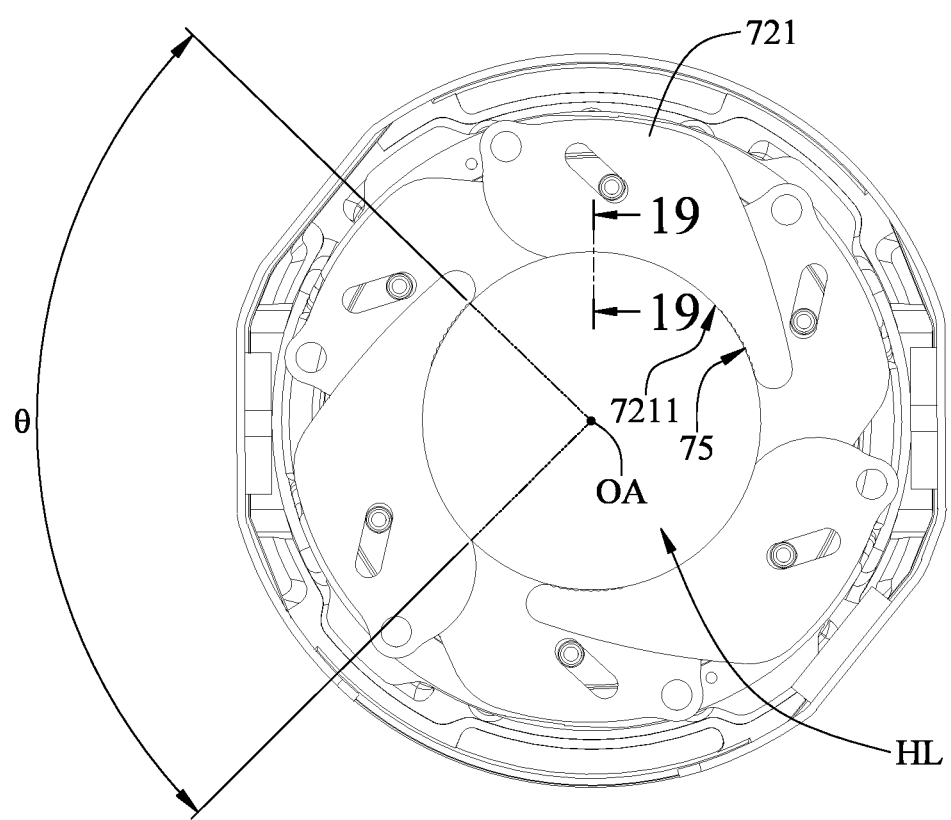
FIG. 19 is a top view of the variable aperture module of an imaging lens module according to the 7th embodiment of the present disclosure in the case that a light passable hole of the variable aperture module is in its maximum hole size state.
Figure 20:
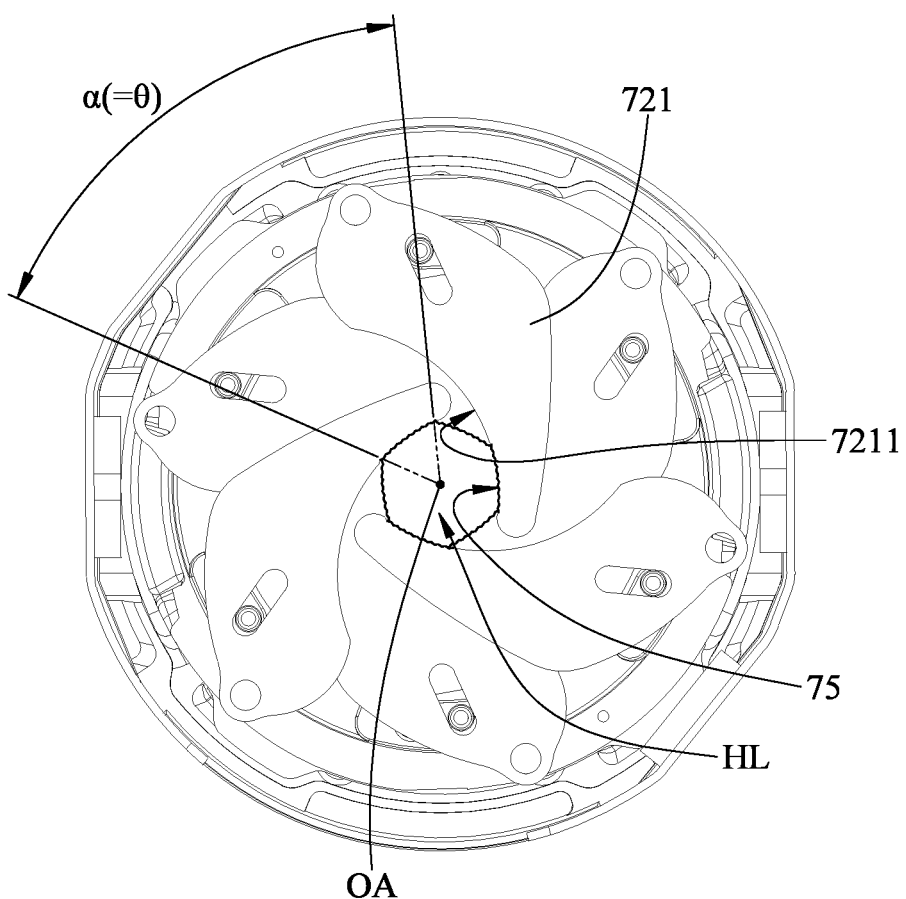
FIG. 20 is a top view of the variable aperture module in FIG. 19 in the case that the light passable hole is in its minimum hole size state.
Figure 21:
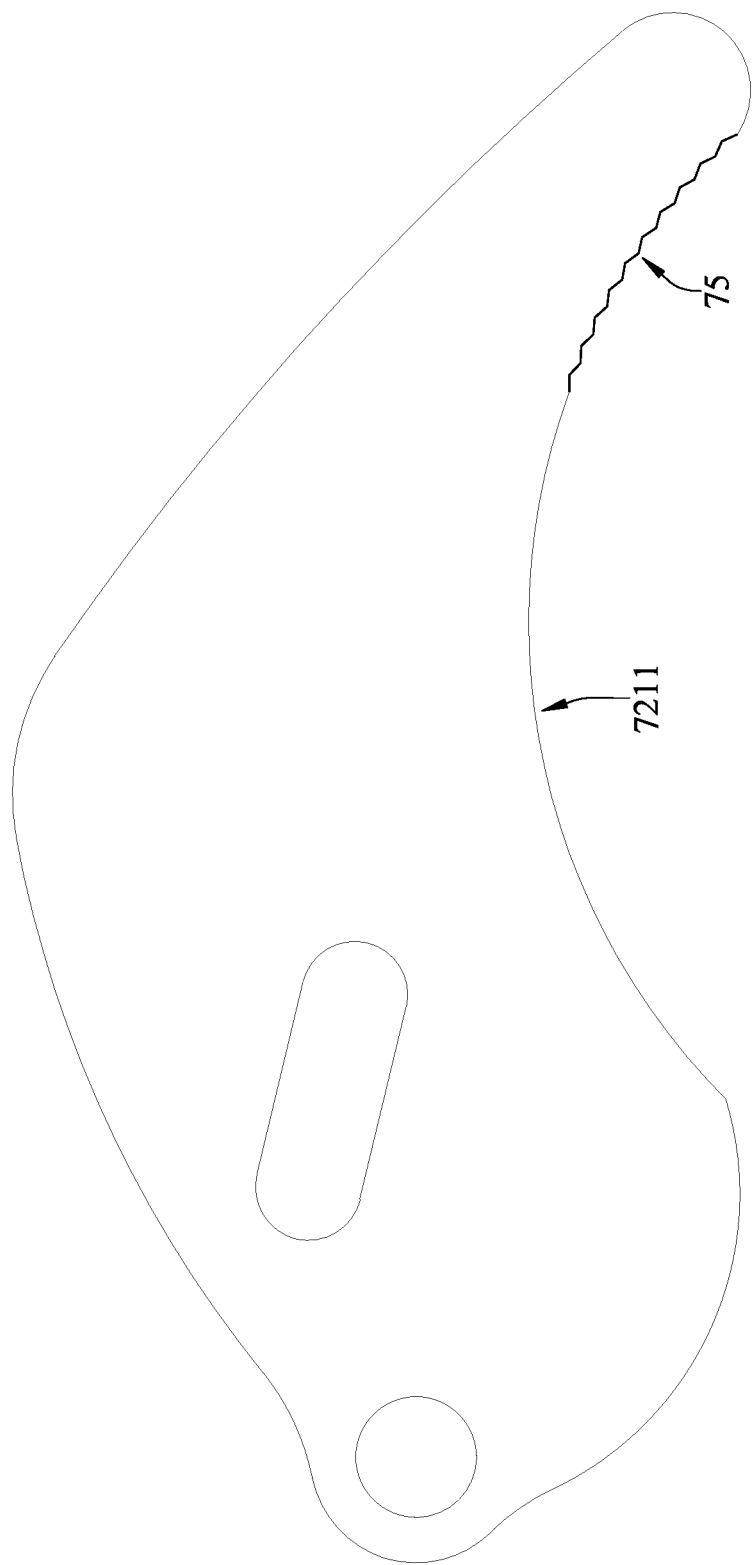
FIG. 21 is a top view of a movable blade of the variable aperture module in FIG. 19.
Figure 22:
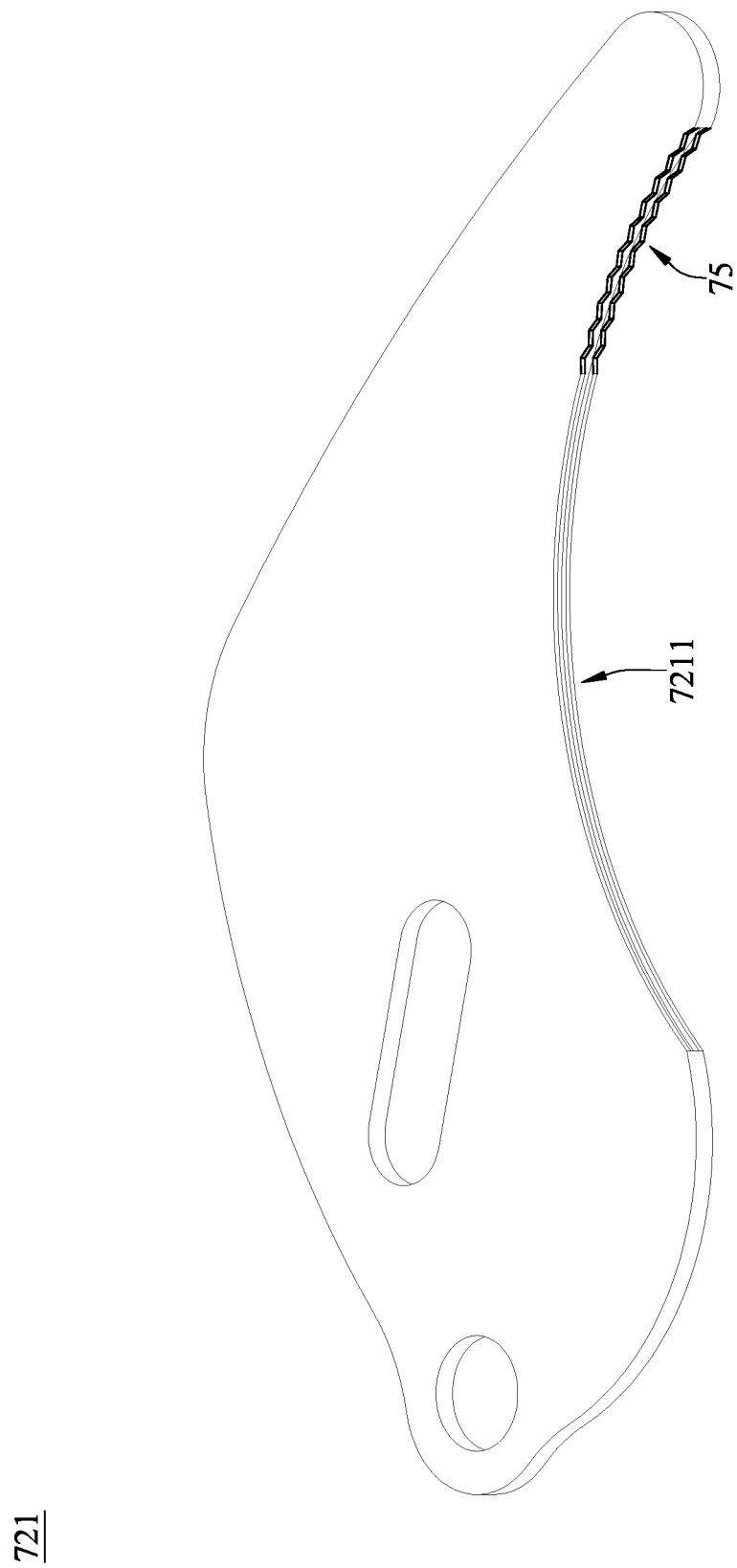
FIG. 22 is a perspective view of a movable blade of the variable aperture module in FIG. 19.
Figure 23:
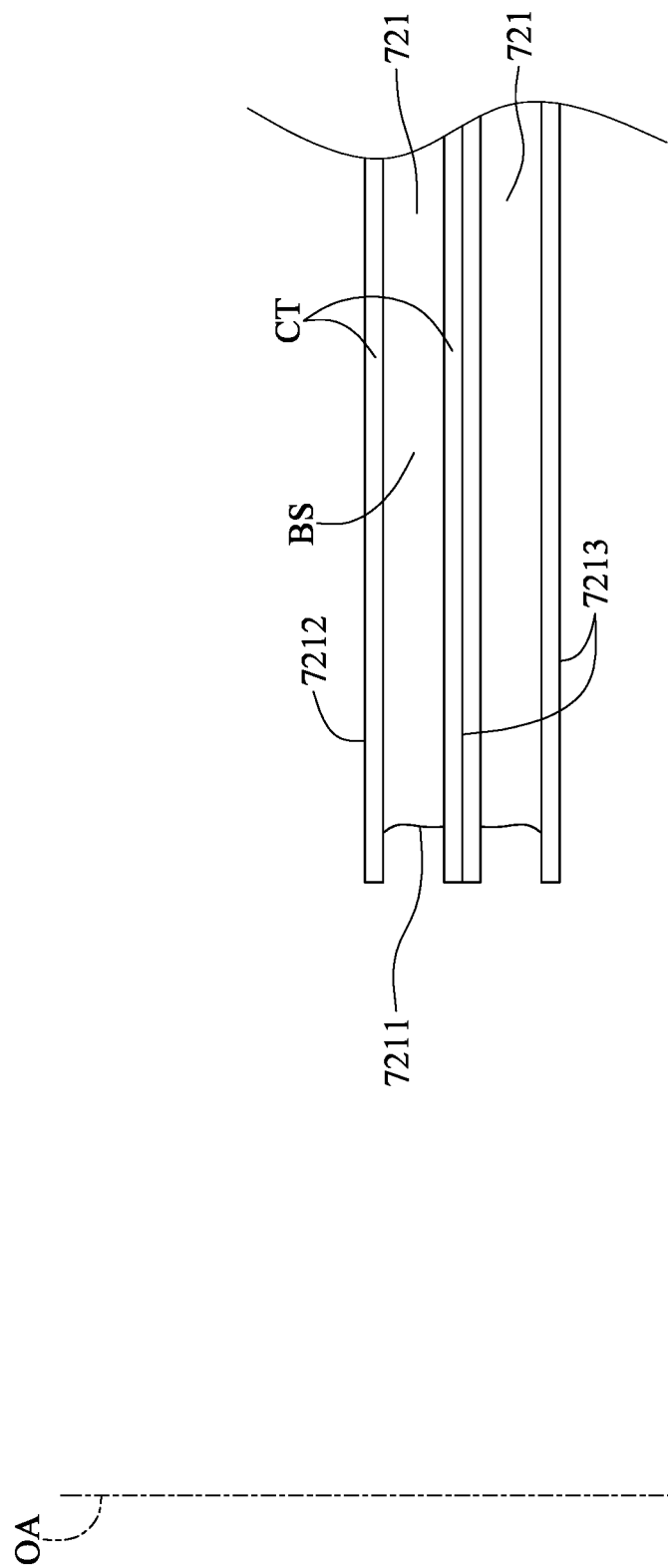
FIG. 23 is a partial and cross-sectional view of the variable aperture module in FIG. 19 along line 19-19.

Please refer to FIG. 19 to FIG. 23, where FIG. 19 is a top view of the variable aperture module of an imaging lens module according to the 7th embodiment of the present disclosure in the case that a light passable hole of the variable aperture module is in its maximum hole size state, FIG. 20 is a top view of the variable aperture module in FIG. 19 in the case that the light passable hole is in its minimum hole size state, FIG. 21 is a top view of a movable blade of the variable aperture module in FIG. 19, FIG. 22 is a perspective view of a movable blade of the variable aperture module in FIG. 19, and FIG. 23 is a partial and cross-sectional view of the variable aperture module in FIG. 19 along line 19-19.

An imaging lens module (not numbered) provided in this embodiment is substantially similar to the imaging lens module 1 of the 1st embodiment in structure. Only difference between this and the 1st embodiments together with description relating to essential structure will be illustrated hereinafter.

In this embodiment, each movable blade 721 is a multi-layer structure of a composite material formed by a base BS with two coating layers CT respectively coated on two opposite surfaces thereof, as shown in FIG. 23.

Unlike the shape of the inner surface 1211 disclosed in the 1st embodiment, the inner surface 7211 in this embodiment has a curved shape, as shown in FIG. 21 and FIG. 22. Moreover, different from the exposed part of the inner surface 1211 (the part of the inner surface 1211 where the matte structures 15 are not disposed) disclosed in the 1st embodiment used for defining the contour of the light passable hole HL in each hole size state, although the exposed part of the inner surface 7211 is used for defining the contour of the light passable hole HL observed along the optical axis OA in the maximum hole size state of the light passable hole HL, as shown in FIG. 19, the exposed part of the inner surface 7211 is not used for defining the contour of the light passable hole HL observed along the optical axis OA in the minimum hole size state of the light passable hole HL, as shown in FIG. 20.

In this embodiment, the inner surface 7211 connected to and located between the first surface 7212 and the second surface 7213 with an air gap formed thereon is non-planar, such that the distance between the inner surface 7211 and the optical axis OA is gradually increased, gradually reduced, and then gently gradually increased along a direction parallel to the optical axis OA from the first surface 7212 to the second surface 7213, as shown in FIG. 23.

In this embodiment, the matte structures 75 disposed on the inner surface 7211 of single movable blade 721 form one group with the matte structures 75 sequentially connected, as shown in FIG. 21 and FIG. 22. The matte structures 75 of this embodiment are used for defining the contour of the light passable hole HL observed along the optical axis OA in the minimum hole size state of the light passable hole HL, as shown in FIG. 20. However, the matte structures 75 of this embodiment are not used for defining the contour of the light passable hole HL observed along the optical axis OA in the maximum hole size state of the light passable hole HL, as shown in FIG. 19.

In this embodiment, in each movable blade 721, the first central angle subtended from the optical axis OA by at least part of the contour of the light passable hole HL on which the plurality of matte structures 75 are located is indicated by "α", and the second central angle subtended from the optical axis OA by at least part of the contour of the light passable hole HL on which the inner surface 7211 is located is indicated by "θ". When the light passable hole HL is in the maximum hole size state, as shown in FIG. 19, the following condition is satisfied: $(\alpha/\theta) \times 100\% = 0\%$ (because the matte structures 75 are not used for defining the contour of the light passable hole HL observed along the optical axis OA, as abovementioned). When the light passable hole HL is in the minimum hole size state, as shown in FIG. 20, the following condition is satisfied: $(\alpha/\theta) \times 100\% = 100\%$ (because the exposed part of the inner surface 7211 where the matte structures 75 are not disposed is not used for defining the contour of the light passable hole HL observed along the optical axis OA, as abovementioned).

In this embodiment, the f-number of the imaging lens is indicated by "Fno". When the light passable hole HL is in the maximum hole size state, as shown in FIG. 19, the following condition is satisfied: Fno=1.4. When the light passable hole HL is in the minimum hole size state, as shown in FIG. 20, the following condition is satisfied: Fno=4.0.

In the abovementioned embodiments, especially in the 1st and 7th embodiments, the inner surfaces 1211 and 7211 used for defining the contour of the light passable holes HL are not totally covered by the matte structures 15 and 75; that is, each of the inner surfaces 1211 and 7211 used for defining the contour of the light passable hole HL has an exposed part (the part of the inner surfaces 1211 and 7211 where the matte structures 15 and 75 are not disposed). However, the present disclosure is not limited thereto. In the following embodiment, another different arrangement of the matte structures is further described.

8th Embodiment

Figure 24:
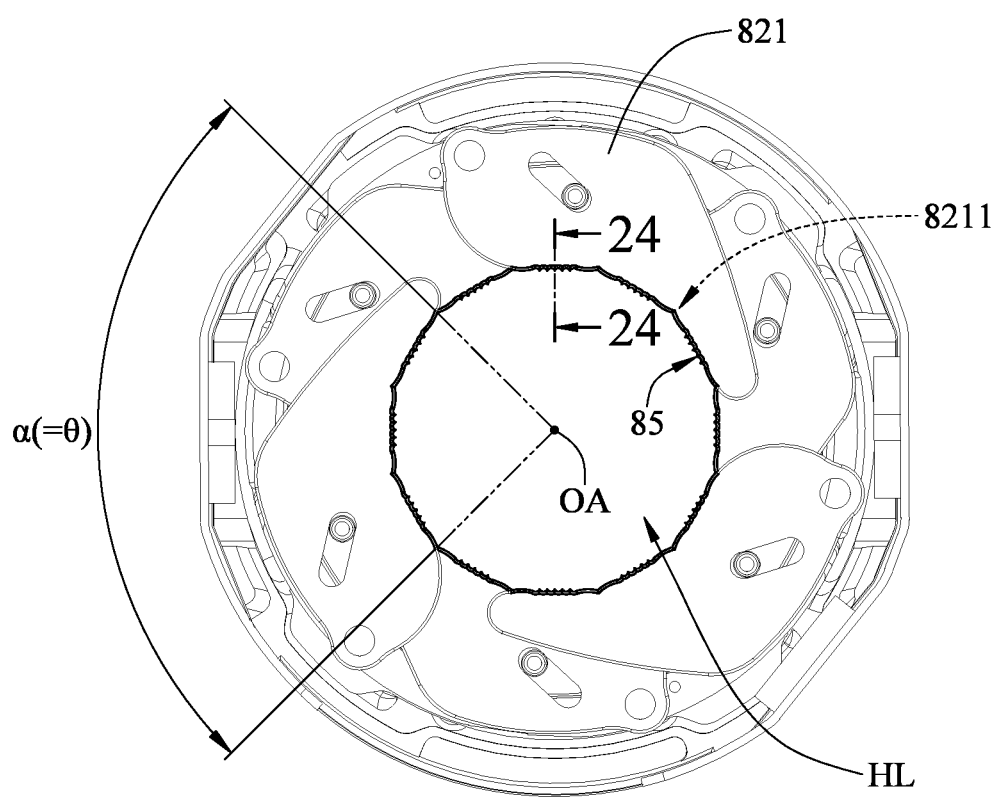
FIG. 24 is a top view of the variable aperture module of an imaging lens module according to the 8th embodiment of the present disclosure in the case that a light passable hole of the variable aperture module is in its maximum hole size state.
Figure 25:
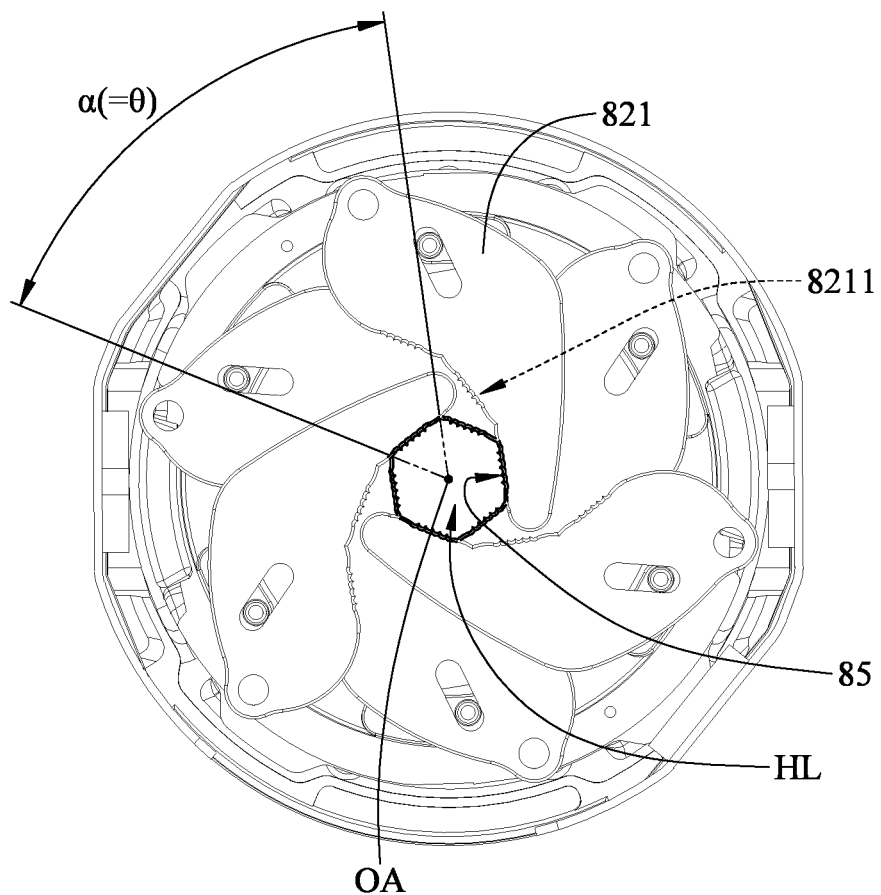
FIG. 25 is a top view of the variable aperture module in FIG. 24 in the case that the light passable hole is in its minimum hole size state.
Figure 26:
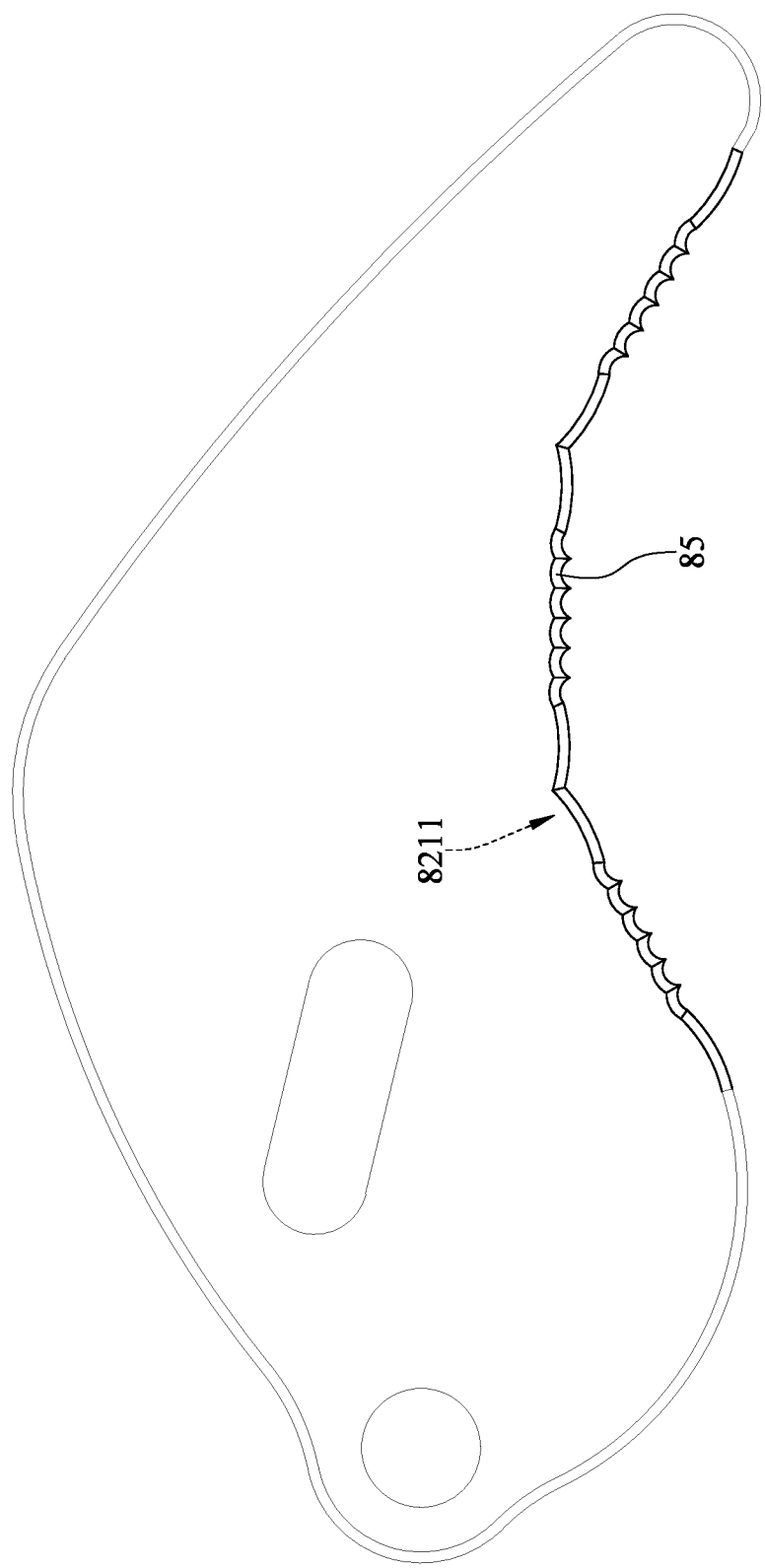
FIG. 26 is a top view of a movable blade of the variable aperture module in FIG. 24.
Figure 27:
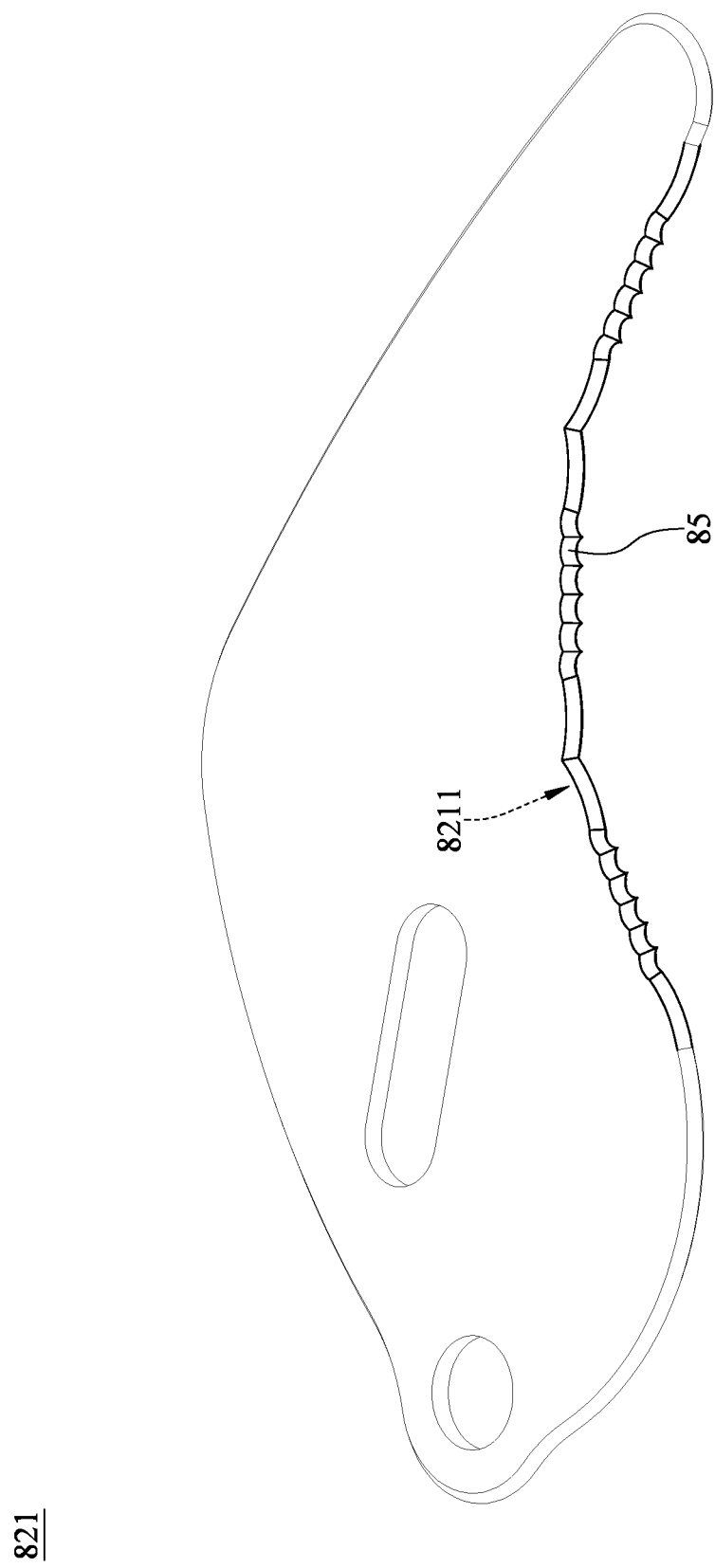
FIG. 27 is a perspective view of a movable blade of the variable aperture module in FIG. 24.
Figure 28:
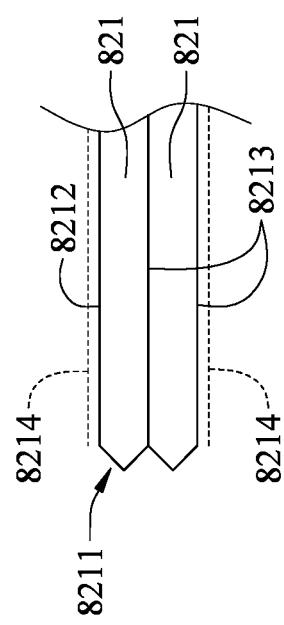
FIG. 28 is a partial and cross-sectional view of the variable aperture module in FIG. 24 along line 24-24.

Please refer to FIG. 24 to FIG. 28, where FIG. 24 is a top view of the variable aperture module of an imaging lens module according to the 8th embodiment of the present disclosure in the case that a light passable hole of the variable aperture module is in its maximum hole size state, FIG. 25 is a top view of the variable aperture module in FIG. 24 in the case that the light passable hole is in its minimum hole size state, FIG. 26 is a top view of a movable blade of the variable aperture module in FIG. 24, FIG. 27 is a perspective view of a movable blade of the variable aperture module in FIG. 24, and FIG. 28 is a partial and cross-sectional view of the variable aperture module in FIG. 24 along line 24-24.

An imaging lens module (not numbered) provided in this embodiment is substantially similar to the imaging lens module 1 of the 1st embodiment in structure. Only difference between this and the 1st embodiments together with description relating to essential structure will be illustrated hereinafter.

In this embodiment, there is a double-chamfer formed on the inner surface 8211 connected to and located between the first surface 8212 and the second surface 8213, such that the distance between the inner surface 8211 and the optical axis OA is gradually reduced and then gradually increased along a direction parallel to the optical axis OA from the first surface 8212 to the second surface 8213, as shown in FIG. 28.

In this embodiment, each movable blade further includes an anti-reflection layer 8214 disposed on the first surface 8212 or the second surface 8213 of single movable blade 821, as shown in FIG. 28.

In this embodiment, the inner surface 8211 of single movable blade 821 is totally covered by the matte structures 85, as shown in FIG. 27 and FIG. 28; that is, the inner surface 8211 in this embodiment used for defining the contour of the light passable hole HL does not have any exposed part. The matte structures 85 totally covering the inner surface 8211 of this embodiment are used for defining the contour of the light passable hole HL observed along the optical axis OA in each hole size state, as shown in FIG. 24 and FIG. 25.

In this embodiment, in each movable blade 821, the first central angle subtended from the optical axis OA by at least part of the contour of the light passable hole HL on which the plurality of matte structures 85 are located is indicated by "α", and the second central angle subtended from the optical axis OA by at least part of the contour of the light passable hole HL on which the inner surface 8211 is located is indicated by "θ". When the light passable hole HL is in the maximum hole size state, as shown in FIG. 24, the following condition is satisfied: $(\alpha/\theta) \times 100\% = 100\%$. When the light passable hole HL is in the minimum hole size state, as shown in FIG. 25, the following condition is satisfied: $(\alpha/\theta) \times 100\% = 100\%$ (because all matte structures 85 are used for defining the contour of the light passable hole HL observed along the optical axis OA in each hole size state, as above-mentioned).

In this embodiment, the f-number of the imaging lens is indicated by "Fno". When the light passable hole HL is in the maximum hole size state, as shown in FIG. 24, the following condition is satisfied: Fno=1.4. When the light passable hole HL is in the minimum hole size state, as shown in FIG. 25, the following condition is satisfied: Fno=4.0.

9th Embodiment

Figure 29:
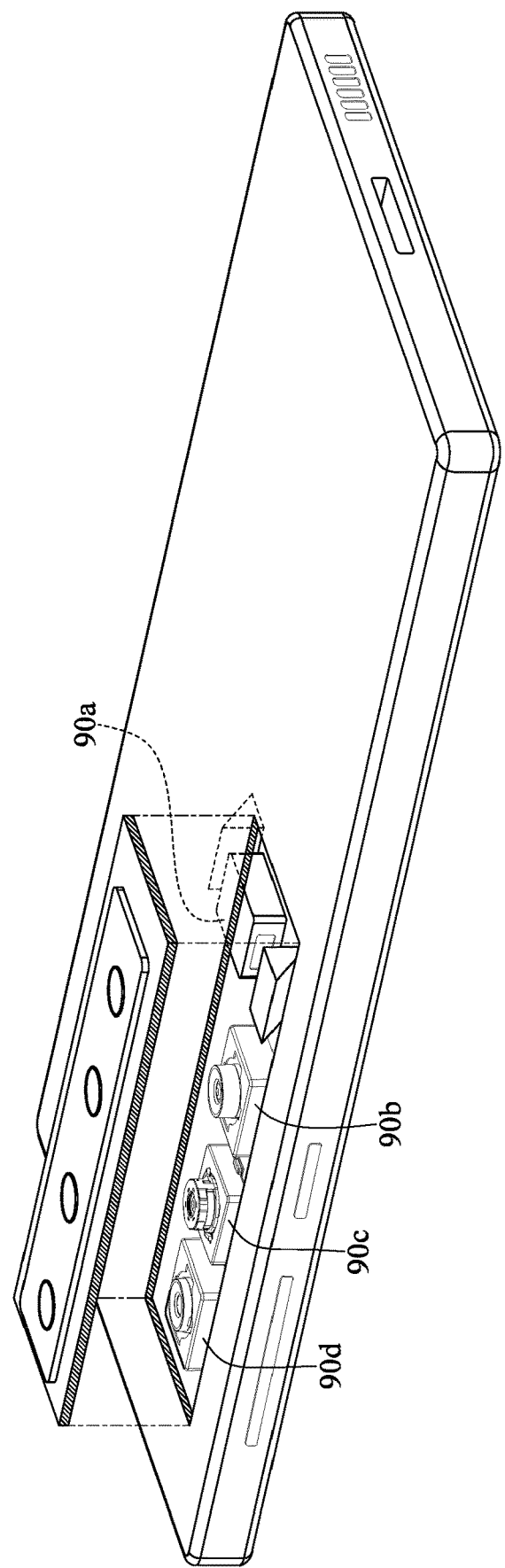
FIG. 29 is an exploded view of an electronic device according to the 9th embodiment of the present disclosure.

Please refer to FIG. 29, which is an exploded view of an electronic device according to the 9th embodiment of the present disclosure.

An electronic device 9 provided in this embodiment is a smartphone including an imaging lens module 90a, an imaging lens module 90b, an imaging lens module 90c, an imaging lens module 90d, a flash module, a focus assist module, an image signal processor, a display module and an image software processor (not shown). The imaging lens module 90a, the imaging lens module 90b, the imaging lens module 90c, and the imaging lens module 90d are disposed on the same side of the electronic device 9, while the display module is disposed on the opposite side of the electronic device 9. Moreover, the imaging lens module 90c is the imaging lens module 1 disclosed in the 1st embodiment. However, the present disclosure is not limited thereto. The imaging lens module 90c may be the imaging lens module disclosed in any one of the abovementioned embodiments.

The imaging lens module 90a is an ultra-telephoto lens, the imaging lens module 90b is a telephoto lens, the imaging lens module 90c is a wide-angle main lens, and the imaging lens module 90d is an ultra-wide-angle lens. The imaging lens module 90a may have a field of view ranging from 5 degrees to 30 degrees, the imaging lens module 90b may have a field of view ranging from 30 degrees to 60 degrees, the imaging lens module 90c may have a field of view ranging from 65 degrees to 90 degrees, and the imaging lens module 90d may have a field of view ranging from 93 degrees to 175 degrees. In this embodiment, the imaging lens modules 90a, 90b, 90c and 90d have different fields of view, such that the electronic device 9 can have various magnification ratios so as to meet the requirement of optical zoom functionality. Moreover, the imaging lens module 90a is an ultra-telephoto lens having a reflective element, which is favorable for thinness of the electronic device 9. In this embodiment, the electronic device 9 includes multiple imaging lens modules 90a, 90b, 90c and 90d, but the present disclosure is not limited to the number and arrangement of imaging lens modules.

When a user captures images of an object, the light rays converge in the imaging lens module 90a, the imaging lens module 90b, the imaging lens module 90c or the imaging lens module 90d to generate images, and the flash module is activated for light supplement. The focus assist module detects the object distance of the imaged object to achieve fast auto focusing. The image signal processor is configured to optimize the captured image to improve image quality and provided zooming function. The light beam emitted from the focus assist module can be either conventional infrared or laser. The display module can include a touch screen or a physical button. The image software processor having multiple functions to capture images and complete image processing, and the image processed by the image software processor can be displayed on the display module.

Please be noted that a lens cover of the electronic device 9 shown in FIG. 29 being spaced apart from the main body thereof is only for better showing the imaging lens modules inside the electronic device 9. It doesn't mean the lens cover have to be removable, and the present disclosure is not limited thereto.

The smartphone in these embodiments is only exemplary for showing the variable aperture module and the imaging lens modules of the present disclosure installed in the electronic device 9, and the present disclosure is not limited thereto. The variable aperture module and the imaging lens modules of the present disclosure can be optionally applied to optical systems with a movable focus. Furthermore, the variable aperture module and the imaging lens modules of the present disclosure feature good capability in aberration corrections and high image quality, and can be applied to 3D image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A variable aperture module, comprising:
  a blade assembly, comprising:
    a plurality of movable blades, disposed around an optical axis to form a light passable hole with adjustable size for different hole size states, wherein each of the plurality of movable blades has an inner surface, and the inner surfaces of the plurality of movable blades are configured to define a contour of the light passable hole in each hole size state;
  a positioning element, comprising:
    a plurality of positioning structures, respectively corresponding to the plurality of movable blades; and
  a driving part, comprising:
    a rotation element, rotatable with respect to the positioning element, wherein the rotation element is configured to rotate the plurality of movable blades respectively with respect to the plurality of positioning structures to adjust a size of the light passable hole; and
    at least two rollable elements, disposed around the optical axis, wherein the rotation element, the at least two rollable elements and a substrate are arranged along a direction parallel to the optical axis, and the at least two rollable elements are disposed between the rotation element and the substrate so as to support rotation of the rotation element;
  wherein there are a plurality of matte structures disposed on each of the inner surfaces, the plurality of matte structures are regularly arranged around the optical axis, each of the plurality of matte structures is single structure extending towards the optical axis, such that of the contour of the light passable hole has an undulating shape at least in several hole size states.

2. The variable aperture module according to claim 1, wherein each of the plurality of movable blades and the plurality of matte structures disposed on the inner surface thereof are made in one piece.

3. The variable aperture module according to claim 1, wherein each of the plurality of movable blades further has:
  a first surface, perpendicular to the optical axis; and
  a second surface, corresponding to the first surface, wherein the inner surface is connected to and located between the first surface and the second surface;
  wherein a distance between the inner surface and the optical axis varies along a direction parallel to the optical axis from the first surface to the second surface.

4. The variable aperture module according to claim 1, wherein each of the plurality of movable blades further has:
  a first surface, perpendicular to the optical axis;
  a second surface, corresponding to the first surface, wherein the inner surface is connected to and located between the first surface and the second surface; and
  an anti-reflection layer, disposed on at least one of the first surface, the second surface and the inner surface.

5. The variable aperture module according to claim 1, wherein in each of the plurality of movable blades, a ratio of a first central angle subtended from the optical axis by at least part of the contour of the light passable hole on which the plurality of matte structures are located to a second central angle subtended from the optical axis by at least part of the contour of the light passable hole on which the inner surface is located is variable according to adjustment of the size of the light passable hole.

6. The variable aperture module according to claim 5, wherein in the case that the light passable hole is in a minimum hole size state, in each of the plurality of movable blades, the first central angle subtended from the optical axis by at least part of the contour of the light passable hole on which the plurality of matte structures are located is α, the second central angle subtended from the optical axis by at least part of the contour of the light passable hole on which the inner surface is located is θ, and the following condition is satisfied:

$$8\% \leq (\alpha/\theta) \times 100\% \leq 100\%.$$

7. The variable aperture module according to claim 1, wherein the driving part further comprising:
  a magnet; and
  a coil, corresponding to the magnet, wherein one of the magnet and the coil is disposed on the rotation element.

8. The variable aperture module according to claim 1, wherein each of the at least two rollable elements has:
  a plurality of contact points, in physical contact with the rotation element or the substrate, and the plurality of contact points having:
    an inner contact point, located closer to the optical axis than other contact points of the plurality of contact points;
    an outer contact point, located farther away from the optical axis than other contact points of the plurality of contact points;
    an upper contact point, being one of two contact points that are most spaced apart from each other in a direction parallel to the optical axis among the plurality of contact points; and
    a lower contact point, being another one of the two contact points that are most spaced apart from each other in the direction parallel to the optical axis among the plurality of contact points.

9. The variable aperture module according to claim 8, wherein a number of the at least two rollable elements is five or less.

10. The variable aperture module according to claim 8, wherein a distance perpendicular to the optical axis between the inner contact point and the outer contact point among the plurality of contact points is Dt, a distance perpendicular to the optical axis between the inner contact point and the lower contact point among the plurality of contact points is Di, and the following condition is satisfied:

$$0.3 \leq Di/Dt \leq 0.7.$$

11. The variable aperture module according to claim 1, wherein each of the at least two rollable elements has:
  a plurality of contact points, in physical contact with the rotation element or the substrate, and the plurality of contact points having:
    an inner contact point, located closer to the optical axis than other contact points of the plurality of contact points;
    an outer contact point, located farther away from the optical axis than other contact points of the plurality of contact points;
    an upper contact point, being one of two contact points that are most spaced apart from each other in a direction parallel to the optical axis among the plurality of contact points; and
    a lower contact point, being another one of the two contact points that are most spaced apart from each other in the direction parallel to the optical axis among the plurality of contact points,
  wherein one of the inner contact point and the outer contact point and one of the upper contact point and the lower contact point among the plurality of contact points are a same contact point.

12. The variable aperture module according to claim 11, wherein a number of the at least two rollable elements is five or less.

13. The variable aperture module according to claim 11, wherein a distance perpendicular to the optical axis between the inner contact point and the outer contact point among the plurality of contact points is Dt, a distance perpendicular to the optical axis between the inner contact point and a remaining contact point among the plurality of contact points is Di, and the following condition is satisfied:

$$0.3 \leq Di/Dt \leq 0.7.$$

14. An imaging lens module, comprising:
the variable aperture module of claim 1; and
an imaging lens, wherein the imaging lens and the variable aperture module are disposed along the optical axis, and light enters into the imaging lens via the light passable hole of the variable aperture module.

15. The imaging lens module according to claim 14, wherein the variable aperture module defines an f-number of the imaging lens, the f-number is Fno, and the following condition is satisfied:

$$0.65 \leq Fno \leq 6.2.$$

16. An electronic device, comprising:
the imaging lens module of claim 14.

17. A variable aperture module, comprising:
a blade assembly, comprising:
 a plurality of movable blades, surrounding an optical axis and forming a light passable hole with adjustable size for different hole size states, wherein each of the plurality of movable blades has an inner surface, and the inner surfaces of the plurality of movable blades are configured to define a contour of the light passable hole in each hole size state, such that the contour of the light passable hole represents a polygon with a plurality of lines;
a positioning element, comprising:
 a plurality of positioning structures, respectively corresponding to the plurality of movable blades; and
a driving part, comprising:
 a rotation element, rotatable with respect to the positioning element, wherein the rotation element is configured to rotate the plurality of movable blades respectively with respect to the plurality of positioning structures to adjust a size of the light passable hole; and
 at least two rollable elements, disposed around the optical axis, wherein the rotation element, the at least two rollable elements and a substrate are arranged along a direction parallel to the optical axis, and the at least two rollable elements are disposed between the rotation element and the substrate so as to support rotation of the rotation element;
wherein there are a plurality of matte structures disposed on each of the inner surfaces, the plurality of matte structures are regularly arranged around the optical axis, each of the plurality of matte structures is single structure extending towards the optical axis, such that of the plurality of lines represented by the contour of the light passable hole is non-linear at least in several hole size states.

18. The variable aperture module according to claim 17, wherein each of the plurality of movable blades and the plurality of matte structures disposed on the inner surface thereof are made in one piece.

19. The variable aperture module according to claim 17, wherein each of the plurality of movable blades further has:
a first surface, perpendicular to the optical axis; and
a second surface, corresponding to the first surface, wherein the inner surface is connected to and located between the first surface and the second surface;
wherein a distance between the inner surface and the optical axis varies along a direction parallel to the optical axis from the first surface to the second surface.

20. The variable aperture module according to claim 17, wherein each of the plurality of movable blades further has:
a first surface, perpendicular to the optical axis;
a second surface, corresponding to the first surface, wherein the inner surface is connected to and located between the first surface and the second surface; and
an anti-reflection layer, disposed on at least one of the first surface, the second surface and the inner surface.

21. The variable aperture module according to claim 17, wherein in each of the plurality of movable blades, a ratio of a first central angle subtended from the optical axis by at least part of the contour of the light passable hole on which the plurality of matte structures are located to a second central angle subtended from the optical axis by at least part of the contour of the light passable hole on which the inner surface is located is variable according to adjustment of the size of the light passable hole.

22. The variable aperture module according to claim 21, wherein in the case that the light passable hole is in a minimum hole size state, in each of the plurality of movable blades, the first central angle subtended from the optical axis by at least part of the contour of the light passable hole on which the plurality of matte structures are located is $\alpha$, the second central angle subtended from the optical axis by at least part of the contour of the light passable hole on which the inner surface is located is $\theta$, and the following condition is satisfied:

$$8\% \leq (\alpha/\theta) \times 100\% \leq 100\%.$$

23. The variable aperture module according to claim 17, wherein the driving part further comprising:
a magnet; and
a coil, corresponding to the magnet, wherein one of the magnet and the coil is disposed on the rotation element.

24. The variable aperture module according to claim 17, wherein each of the at least two rollable elements has:
a plurality of contact points, in physical contact with the rotation element or the substrate, and the plurality of contact points having:
 an inner contact point, located closer to the optical axis than other contact points of the plurality of contact points;
 an outer contact point, located farther away from the optical axis than other contact points of the plurality of contact points;
 an upper contact point, being one of two contact points that are most spaced apart from each other in a direction parallel to the optical axis among the plurality of contact points; and
 a lower contact point, being another one of the two contact points that are most spaced apart from each other in the direction parallel to the optical axis among the plurality of contact points.

25. The variable aperture module according to claim 24, wherein a number of the at least two rollable elements is five or less.

26. The variable aperture module according to claim 24, wherein a distance perpendicular to the optical axis between the inner contact point and the outer contact point among the plurality of contact points is Dt, a distance perpendicular to the optical axis between the inner contact point and the lower contact point among the plurality of contact points is Di, and the following condition is satisfied:

$0.3 \leq Di/Dt \leq 0.7$.

27. The variable aperture module according to claim 17, wherein each of the at least two rollable elements has:
a plurality of contact points, in physical contact with the rotation element or the substrate, and the plurality of contact points having:
an inner contact point, located closer to the optical axis than other contact points of the plurality of contact points;
an outer contact point, located farther away from the optical axis than other contact points of the plurality of contact points;
an upper contact point, being one of two contact points that are most spaced apart from each other in a direction parallel to the optical axis among the plurality of contact points; and
a lower contact point, being another one of the two contact points that are most spaced apart from each other in the direction parallel to the optical axis among the plurality of contact points,
wherein one of the inner contact point and the outer contact point and one of the upper contact point and the lower contact point among the plurality of contact points are a same contact point.

28. The variable aperture module according to claim 27, wherein a number of the at least two rollable elements is five or less.

29. The variable aperture module according to claim 27, wherein a distance perpendicular to the optical axis between the inner contact point and the outer contact point among the plurality of contact points is Dt, a distance perpendicular to the optical axis between the inner contact point and a remaining contact point among the plurality of contact points is Di, and the following condition is satisfied:

$0.3 \leq Di/Dt \leq 0.7$.

30. An imaging lens module, comprising:
the variable aperture module of claim 17; and
an imaging lens, wherein the imaging lens and the variable aperture module are disposed along the optical axis, and light enters into the imaging lens via the light passable hole of the variable aperture module.

31. The imaging lens module according to claim 30, wherein the variable aperture module defines an f-number of the imaging lens, the f-number is Fno, and the following condition is satisfied:

$0.65 \leq Fno \leq 6.2$.

32. An electronic device, comprising:
the imaging lens module of claim 30.

* * * * *